(12) United States Patent
Schweikardt et al.

(10) Patent No.: US 9,472,112 B2
(45) Date of Patent: Oct. 18, 2016

(54) EDUCATIONAL CONSTRUCTION MODULAR UNIT

(75) Inventors: Eric Schweikardt, Boulder, CO (US); Mark D. Gross, Pittsburgh, PA (US)

(73) Assignee: MODULAR ROBOTICS INCORPORATED, Boulder, CO (US)

( * ) Notice: Subject to any disclaimer, the term of this patent is extended or adjusted under 35 U.S.C. 154(b) by 101 days.

(21) Appl. No.: 13/386,707

(22) PCT Filed: Jul. 23, 2010

(86) PCT No.: PCT/US2010/002084
§ 371 (c)(1),
(2), (4) Date: Jan. 24, 2012

(87) PCT Pub. No.: WO2011/011084
PCT Pub. Date: Jan. 27, 2011

(65) Prior Publication Data
US 2012/0122059 A1    May 17, 2012

Related U.S. Application Data

(60) Provisional application No. 61/228,169, filed on Jul. 24, 2009, provisional application No. 61/343,400, filed on Apr. 28, 2010.

(51) Int. Cl.
*G09B 1/36* (2006.01)
*A63H 33/04* (2006.01)
*G09B 19/00* (2006.01)
*G09B 23/00* (2006.01)
*G09B 25/00* (2006.01)

(52) U.S. Cl.
CPC ............... *G09B 1/36* (2013.01); *A63H 33/04* (2013.01); *G09B 19/00* (2013.01); *G09B 23/00* (2013.01); *G09B 25/00* (2013.01)

(58) Field of Classification Search
CPC .................................. G09B 19/0053
USPC .............. 434/118; 446/124, 125, 484; 463/9
See application file for complete search history.

(56) References Cited

U.S. PATENT DOCUMENTS 3,640,018 A    2/1972  Light
3,768,178 A *  10/1973 Glassman .................. 434/190

(Continued)

OTHER PUBLICATIONS

Bordignon (Robotics & Automation, 2009. ICRA '09, IEEE International Conference on : A Virtual Machine-base Approach for Fast and Flexible Reprogramming of Modular Robots (pp. 4273-4280).*

(Continued)

*Primary Examiner* — Robert J Utama
*Assistant Examiner* — Elroy S Crocker
(74) *Attorney, Agent, or Firm* — Neugeboren O'Dowd PC

(57) ABSTRACT

The present invention is a robotics construction kit that serves as a platform for children to engage in problem-solving and innovative thinking in science, technology, engineering, and mathematics. By designing and building robotics constructions from an apparently simple set of blocks that encapsulate the kinetic, electronic, and software elements of robots, children and others can encounter, explore, and experiment with basic principles of science and computation. Unlike existing robotics construction kits for education, the present invention embodies computation in every element, which affords understanding systems of distributed computation, rather than systems of top-down control.

8 Claims, 30 Drawing Sheets

(56) References Cited

U.S. PATENT DOCUMENTS

| | | | |
|---|---|---|---|
| 4,183,173 A | | 1/1980 | Ogawa |
| 4,334,221 A | * | 6/1982 | Rosenhagen .......... A63H 30/04 180/167 |
| 4,990,099 A | * | 2/1991 | Marin .................. H01R 13/642 439/171 |
| 5,172,534 A | | 12/1992 | Milner et al. |
| 5,746,638 A | | 5/1998 | Shiraishi |
| 6,062,937 A | | 5/2000 | Kikuchi |
| 6,206,745 B1 | * | 3/2001 | Gabai et al. ..................... 446/91 |
| 6,443,796 B1 | * | 9/2002 | Shackelford ..................... 446/91 |
| 6,454,624 B1 | | 9/2002 | Duff et al. |
| 6,505,087 B1 | | 1/2003 | Lucas et al. |
| 6,575,802 B2 | | 6/2003 | Yim et al. |
| 6,585,553 B1 | | 7/2003 | Fetridge et al. |
| 6,605,914 B2 | | 8/2003 | Yim et al. |
| 6,626,727 B2 | * | 9/2003 | Balanchi ......................... 446/85 |
| 6,733,360 B2 | | 5/2004 | Dooley et al. |
| 6,795,318 B2 | | 9/2004 | Haas et al. |
| 6,893,316 B2 | | 5/2005 | Maxwell et al. |
| 6,902,461 B1 | | 6/2005 | Munch et al. |
| 6,939,192 B1 | | 9/2005 | Munch et al. |
| 7,066,778 B2 | | 6/2006 | Kretzschmar |
| 7,316,567 B2 | * | 1/2008 | Hsieh .................. A63H 33/08 434/171 |
| 7,322,873 B2 | | 1/2008 | Rosen et al. |
| 7,444,205 B2 | * | 10/2008 | Desmond ............... B82Y 10/00 700/245 |
| 7,507,136 B2 | * | 3/2009 | Patton .................. A63H 33/046 335/285 |
| 8,079,890 B2 | * | 12/2011 | Seligman ....................... 446/124 |
| 2005/0234592 A1 | | 10/2005 | McGee et al. |
| 2006/0095893 A1 | | 5/2006 | Vahid et al. |
| 2006/0100739 A1 | | 5/2006 | Raffle et al. |
| 2006/0136180 A1 | | 6/2006 | Hansen et al. |
| 2007/0262984 A1 | | 11/2007 | Pruss |
| 2009/0273560 A1 | * | 11/2009 | Kalanithi ................ G06F 3/002 345/156 |
| 2010/0001923 A1 | * | 1/2010 | Zilber ..................... A63F 13/80 345/1.1 |
| 2010/0216548 A1 | * | 8/2010 | Ellis ........................ A63F 13/10 463/31 |

OTHER PUBLICATIONS

Bordignon (Robotics and Automation, 2009/ ICRA 2009/ IEEE International Conference: A Virtual Machine-Based Approach for Fast and Flexible Reprogramming of Modular Robots (pp. 4273-4280).*

Schweikardt, E. et al, roBlocks: A Robotic Construction Kit for Mathematics and Science Education, URL: http://code.arc.cmu.edu/lab/upload/sp151-schweikardt.0.pdf, Nov. 4, 2006, pp. 1-4, Banff, Alberta Canada.

Schweikardt, E. et al, Learning About Complexity with Modular Robots, Digital Games and Intelligent Toys Based Education, 2008 Second IEEE Int'l Conference ON, IEEE, Piscataway, NJ, USA, Nov. 17, 2008, pp. 116-123.

Schweikardt, E. et al, A Brief Survey of Distributed Computational Toys, Digital Game and Intelligent Toy Enhanced Learning, 2007, The First IEEE Int'l Workshop ON, IEEE, PI, Mar. 1, 2007, pp. 57-64.

International Search Report and Written Opinion for International Application No. PCT/US2010/002084 dated Sep. 27, 2010.

International Preliminary Report on Patentability for International Application No. PCT/US2010/002084 dated Feb. 2, 2012.

* cited by examiner

8

9

| Unit ID | Time-date | Source code |
|---|---|---|
| 000000001 | 0900 1 July 2010 | .... |
| 000000002 | 0900 1 July 2010 | .... |
| 000000001 | 0905 1 July 2010 | ..... |
| 000000003 | 0900 1 July 2010 | .... |
| 000000004 | 0900 1 July 2010 | .... |
| 000000002 | 0930 1 July 2010 | .... |
| | | |
| | | |
| | | |

FIG. 28

EDUCATIONAL CONSTRUCTION MODULAR UNIT

CROSS REFERENCE TO RELATED APPLICATIONS

The present application is a U.S. National Stage under 35 USC 371 filing of International Application Number PCT/US2010/002084, entitled "MODULAR ROBOTICS" filed on Jul. 23, 2010, which is a Nonprovisional Application of U.S. Provisional Application Ser. No. 61/343,400, entitled "HERMAPHRODITIC MAGNETIC ELECTRIC CONNECTOR" filed on Apr. 28, 2010, and a Nonprovisional Application of U.S. Provisional Application Ser. No. 61/288,169, entitled "MODULAR ROBOTS" filed on Jul. 24, 2009, which are all incorporated herein by reference.

FIELD OF THE INVENTION

The present invention is related generally to the learning of science, technology, engineering, and mathematics, and in particular to a robotics construction kit.

BACKGROUND OF THE INVENTION

Systems exist for children to construct and program robots but no robotics construction toys use the same modular blocks paradigm or enable children to build robots without programming. Existing systems for constructing robots are centralized, with one computer that controls robot operation. None of these products embody a distributed computing model and none allow the modular construction of robots by beginners. The few toys that contain more than one node of computation are passive entertainment products.

SUMMARY OF INVENTION

The present invention is a decentralized modular system for constructing and programming robots comprising concurrent communicating microcontrollers. The present invention is a robotics construction kit that serves as a platform for children to engage in problem-solving and innovative thinking in science, technology, engineering, and mathematics. By designing and building robotics constructions from an apparently simple set of blocks that encapsulate the kinetic, electronic, and software elements of robots, children and others can encounter, explore, and experiment with basic principles of science and computation. Unlike existing robotics construction kits for education, the present invention embodies computation in almost every element, which affords understanding systems of distributed computation, rather than systems of top-down control.

BRIEF DESCRIPTION OF THE DRAWINGS

The invention is further illustrated by the following drawings in which:

FIG. 28 is a representation of the database of source code stored in the units of the distributed modular robot;

DETAILED DESCRIPTION OF THE INVENTION

As used herein in the specification and claims, including as used in the examples and unless otherwise expressly specified, all numbers may be read as if prefaced by the word "about", even if the term does not expressly appear. Also, any numerical range recited herein is intended to include all subranges subsumed therein.

Figure 1:
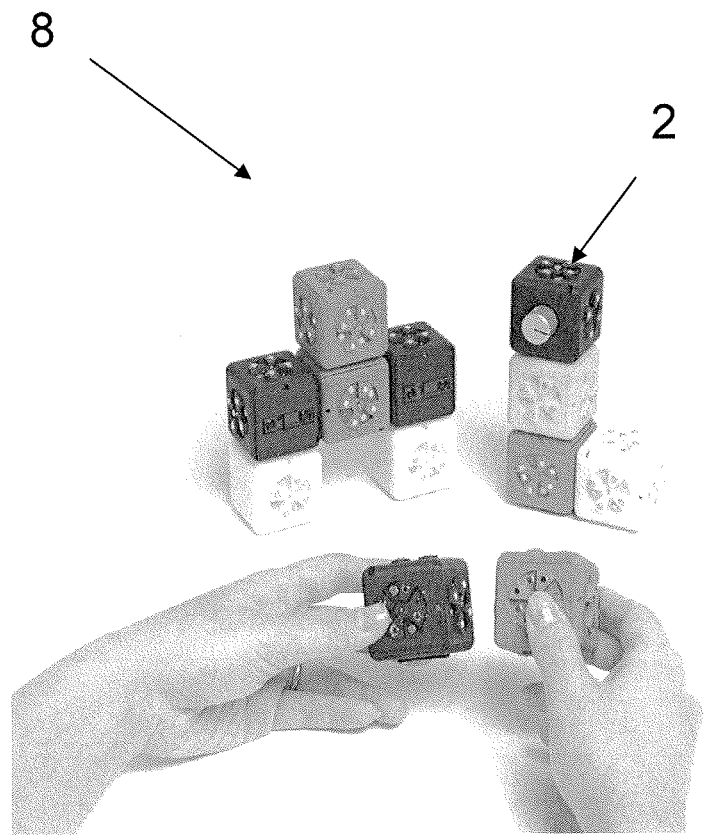
FIG. 1 is a pictorial representation of one embodiment of a construction of the present invention.
Figure 2:
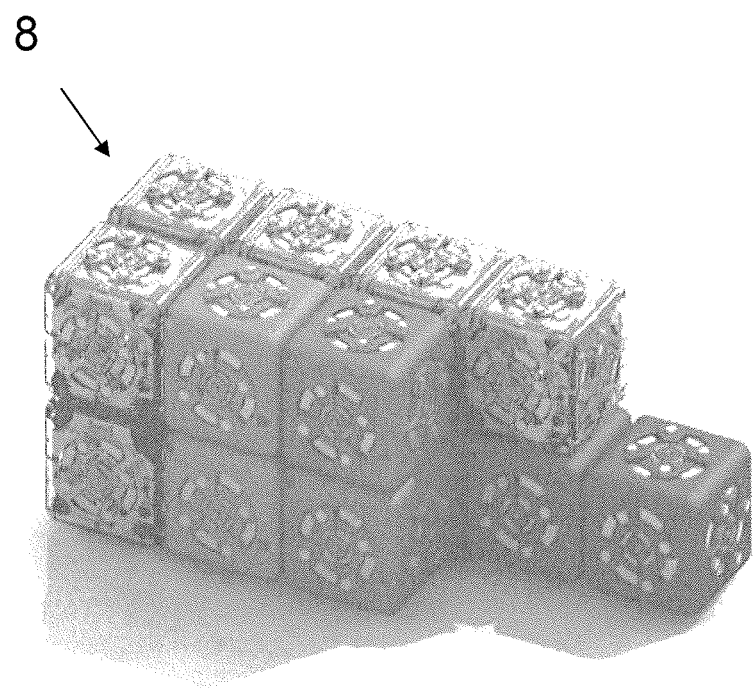
FIG. 2 is a pictorial representation illustrating an assembly of modular unit or blocks of the present invention interconnected to form another construction.
Figure 3:
FIG. 3 is a pictorial representation of an embodiment of a construction of the present invention that steers away from light sources.

FIGS. 1-3 illustrate the present invention being a set of blocks 2, also called modular units, with embedded electronic device 4 (for example, printed circuit board) and hermaphroditic electrical and magnetic connectors through the sides 6 of each block 2. Software (reprogrammable or non-reprogrammable) runs on the microcontroller on embedded electronic device 4 inside each block 2. One embodiment of the present invention includes a reprogramming system that enables end-users to reprogram the reprogrammable software running inside predetermined blocks 2. When blocks 2 are attached to one another to make a construction, the blocks 2 form a network and pass data from one block 2 to another block 2, giving the construction 8 a unique and specific behavior.

The present invention can be any size. For illustration purposes only, blocks 2 can be 40 mm plastic cube-shaped blocks that snap together with magnetic 23 and electric connectors 24, 25, 26 (FIGS. 8-11). Children use them to create constructions (FIGS. 1, 2, 3) that respond to light, sound, proximity, and other external conditions, and produce light, sound, and motion. For example, the present invention assembled as a modular robot shown in FIG. 3 moves on a tabletop and steers away from a light source.

Every block 2 contains a microcontroller and supporting electronics. The microcontroller in each block runs a program in firmware, which provides the default behavior of the blocks. All blocks initially run the same firmware program. In alternative embodiments of the present invention, users may replace the initial firmware using a reprogramming interface described below.

There are four categories of blocks: Sensors, Operators, Actuators, and Utilities. Different colors of plastic indicate the block categories. Sensor blocks sense signals from the environment (including light, sound, touch, motion and distance from objects) and pass signals to connected neighboring blocks. Operator blocks apply functions to those signals including arithmetic functions that compute a number from two or more numbers, such as sum, maximum, minimum, inverse and threshold. Actuator blocks convert signals they receive into various types of action. For example, a motorized tread block (FIG. 4) drives around on a tabletop with a speed dependent on the signals it receives. Other actuator blocks have rotating faces, bright LEDs and piezoelectric speakers. Utility blocks include a power source block, including a battery, such as a lithium-ion or solar powered battery, that must be included in each construction. Utility blocks can include a passive data-connection blocks that affect the physical form of a construction without affecting the flow or content of data. Utility blocks can include a communication block being either hard wired or wireless that enable a nearby computer or mobile device to communicate with a construction. Some utility blocks can be pass-through blocks that allow data to flow through them without changing the data. Some utility blocks can be blocker blocks that restrict the flow of data through a construction. These last two may also be thought of as special Operator blocks.

Figure 5:
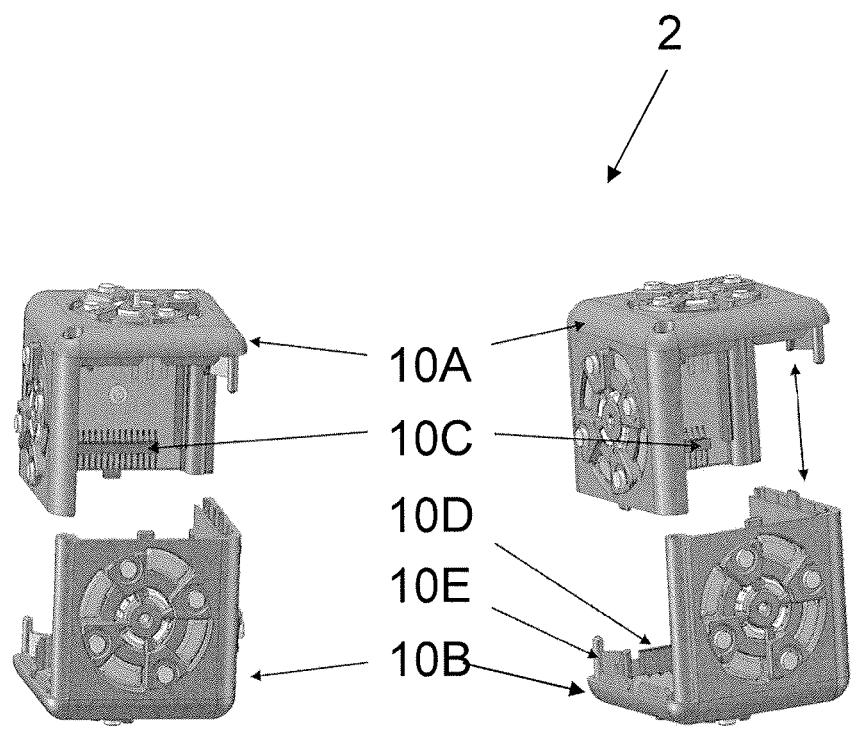
FIGS. 5A and 5B are exploded views of two modular unit or block halves with a slideable relationship thereto to connect together.
Figure 6:
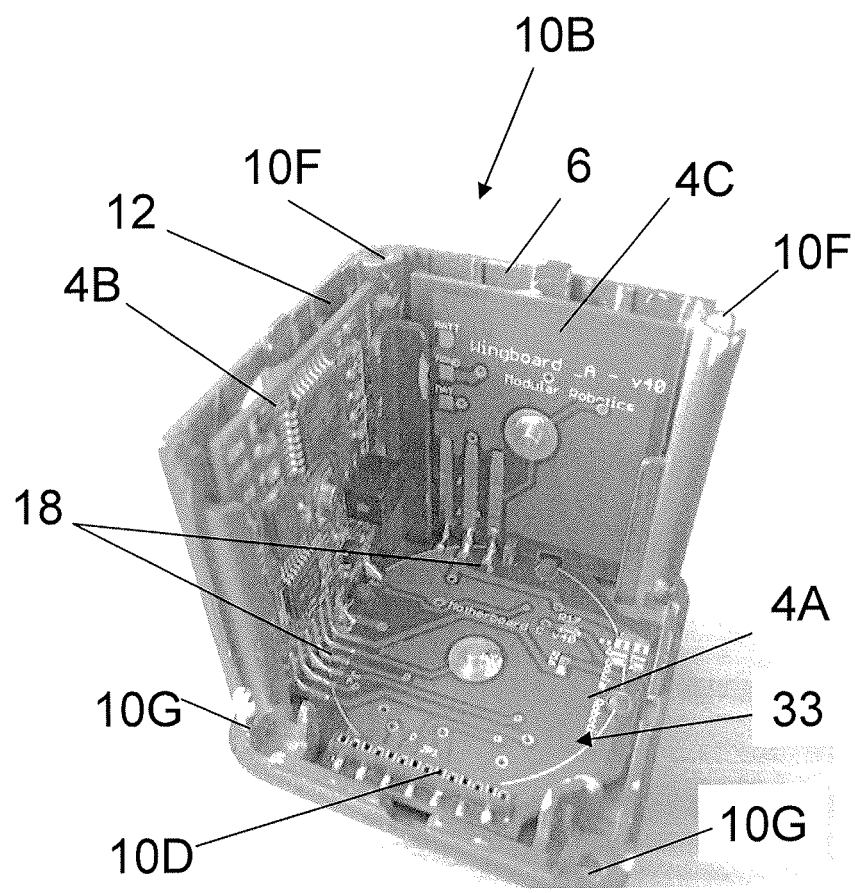
FIG. 6 is a pictorial representation showing the inside of one embodiment of the halve modular unit or block of the present invention, which contains printed circuit boards attached to the inside volume of the modular unit or block.

Now turning to FIGS. 5A, 5B, and 6, each block 2 is assembled from two nearly identical three-sided halves 10A, 10B that slide and mechanically interconnect, and electronically interconnect together (FIGS. 5A and 5B), enclosing printed circuit boards 33 mounted on the inner surface 12 of block 2 (FIG. 6) forming a gap 14 between printed circuit board 33 and inner surface 12 of block 2. Except for special faces on Sensor and Actuator blocks, all block sides 6 are identical, and hermaphroditic connectors (described below) on each side 6 attach pairs of blocks physically and electrically and allow any block 2 to connect to any other block 2 in any of four orientations, or other orientations depending on the geometry configuration of the block. Block mechanical interconnectivity can be achieved with any acceptable attachment device including screws (not shown) that are received into internally threaded holes 10F and threaded or non-threaded holes 10G in both block halves 10A, 10B, as illustrated in block halve 10B in FIG. 6. Block electronic interconnectivity can be achieved with any acceptable electronic coupling device including a interconnecting male electrical connector 10C in block halve 10A and female connector 10D in block halve 10B. Also an electrical strip connected to block halves 10A, 10B can be used to electrically couple the two halves 10A, 10B. Once the two halves 10A, 10B are coupled, all six sides of block unit 2 are in electronic communication with each other.

In one embodiment of embedded electronic device 4 one or more printed circuit boards 4A can be configured to be adjacent to an inner surface 12 of side 6. In the case where there is more than one printed circuit board, solder joints 18 electrically couple three individual circuit boards 4A, 4B, 4C, as shown in FIG. 6.

Each block 2 contains a core set of identical embedded electronic device 4 on one or more printed circuit boards: a microcontroller, programming header, shift register, and power management circuitry. In addition, some blocks contain additional electronics and mechanics specific to their functions. For example, the motorized tread block (see FIGS. 4 and 7) contains a printed circuit daughterboard 4B with an H-bridge motor controller integrated circuit to drive a small geared DC motor 22. The wireless communication block contains a radio frequency transceiver to communicate with a PC or mobile device with a wireless communication protocol such as Bluetooth or Zigbee.

Each sensor block and each actuator block has a special face that houses its sensor or actuator. These special faces may or may not contain hermaphroditic connectors to attach to other blocks. For example, the special spinning face 45 of the rotation actuator block 47 (see FIG. 8) contains a hermaphroditic connector 20 that enables the block to connect to, and rotate, a neighboring or adjacent block. On the other hand, the special sensor face of the light sensor block does not contain a hermaphroditic connector, as it is intended to be exposed in order to detect light.

Figure 9:
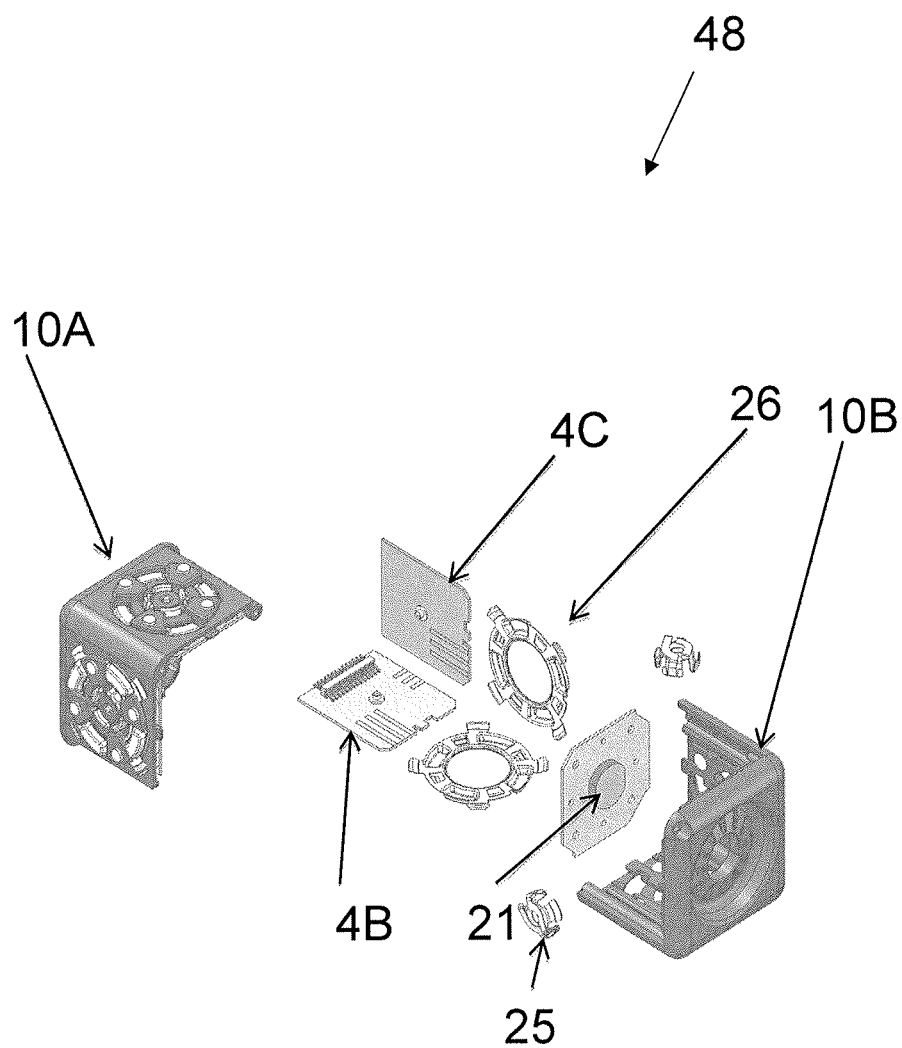
FIG. 9 is an exploded view of a light sensor block.

Now turning to FIG. 9, a light sensor block 48 can contain a photoresistor 21 mounted on one face that is wired to an analog input on the microcontroller, which senses the ambient light level.

Figure 10:
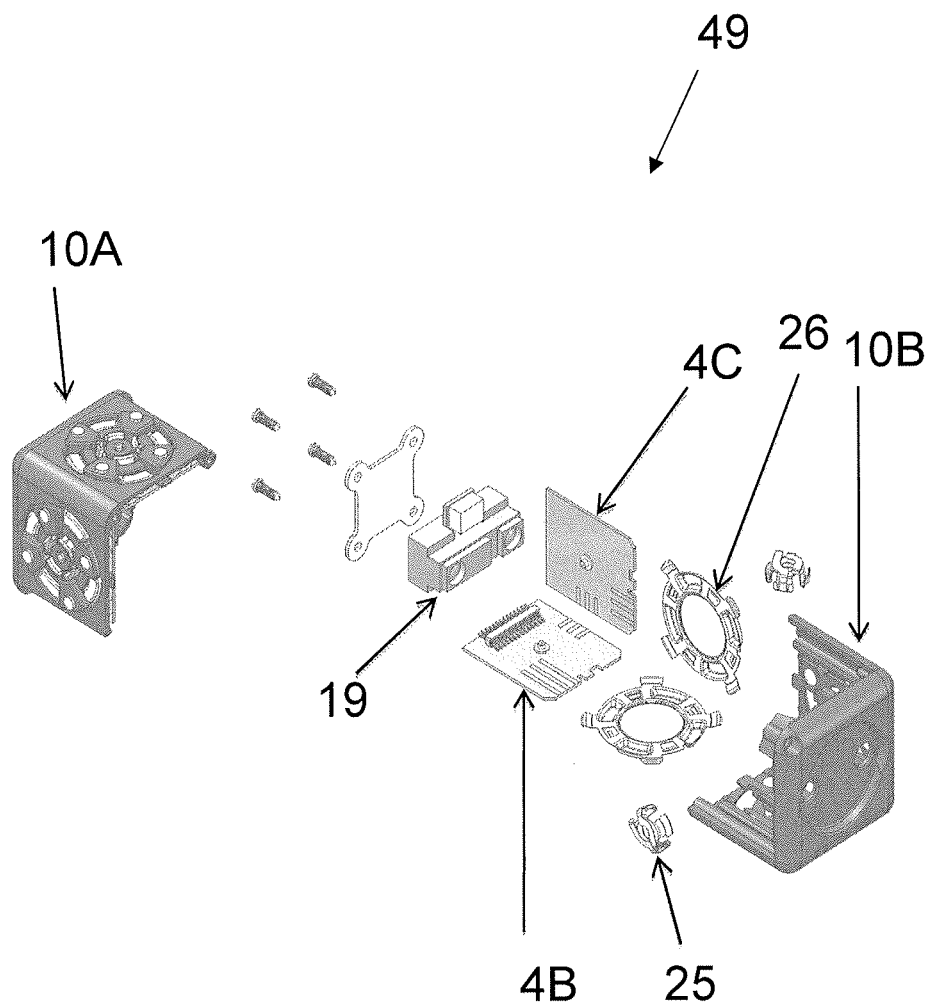
FIG. 10. is an exploded view of a distance sensor block.

Now turning to FIG. 10, distance sensor block 49 can contain a distance sensor 19, such as a Sharp GDP-series sensor, mounted on one face that transduces the distance of any object within its field of view into a resistance, which is wired to an analog input on the microcontroller.

Figure 11:
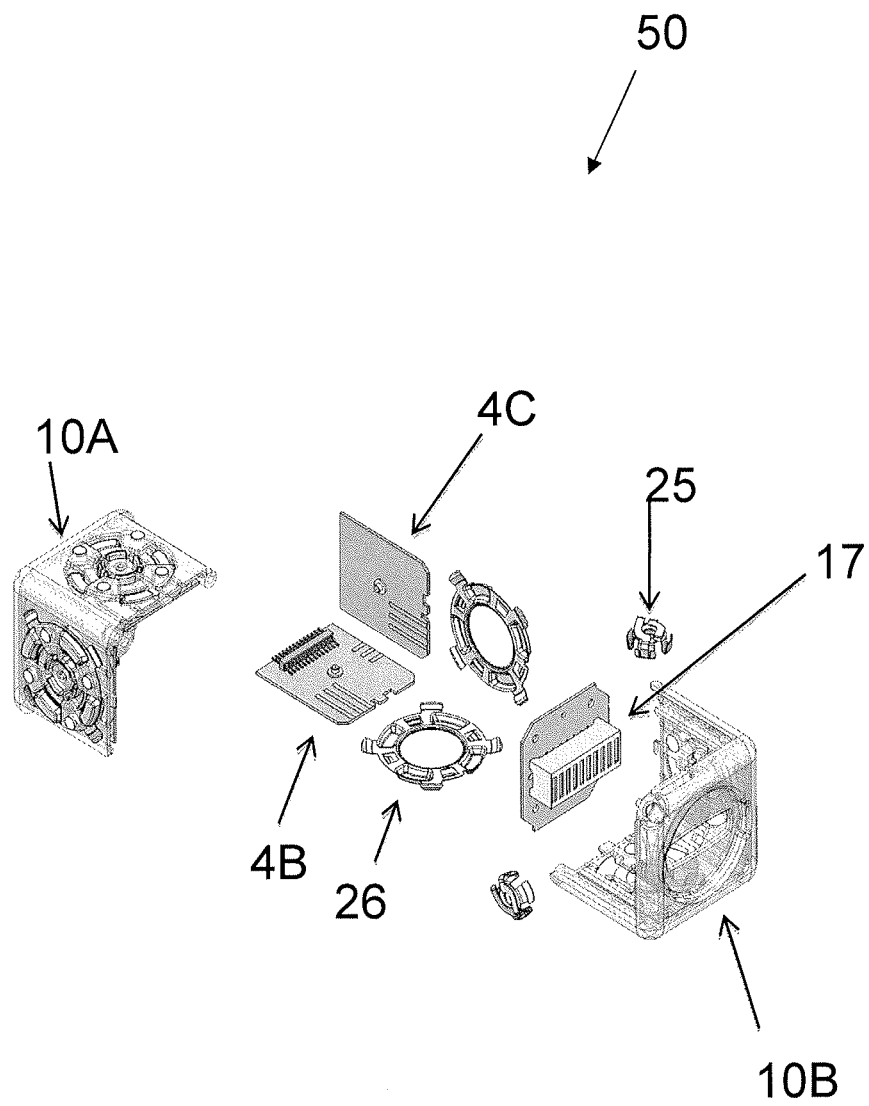
FIG. 11 is an exploded view of a LED bar graph display block.

Now turning to FIG. 11, an LED bar graph display block 50 can contain an LED bar graph display 17 mounted on one face that is wired to an analog output on the microcontroller.

Figure 12:
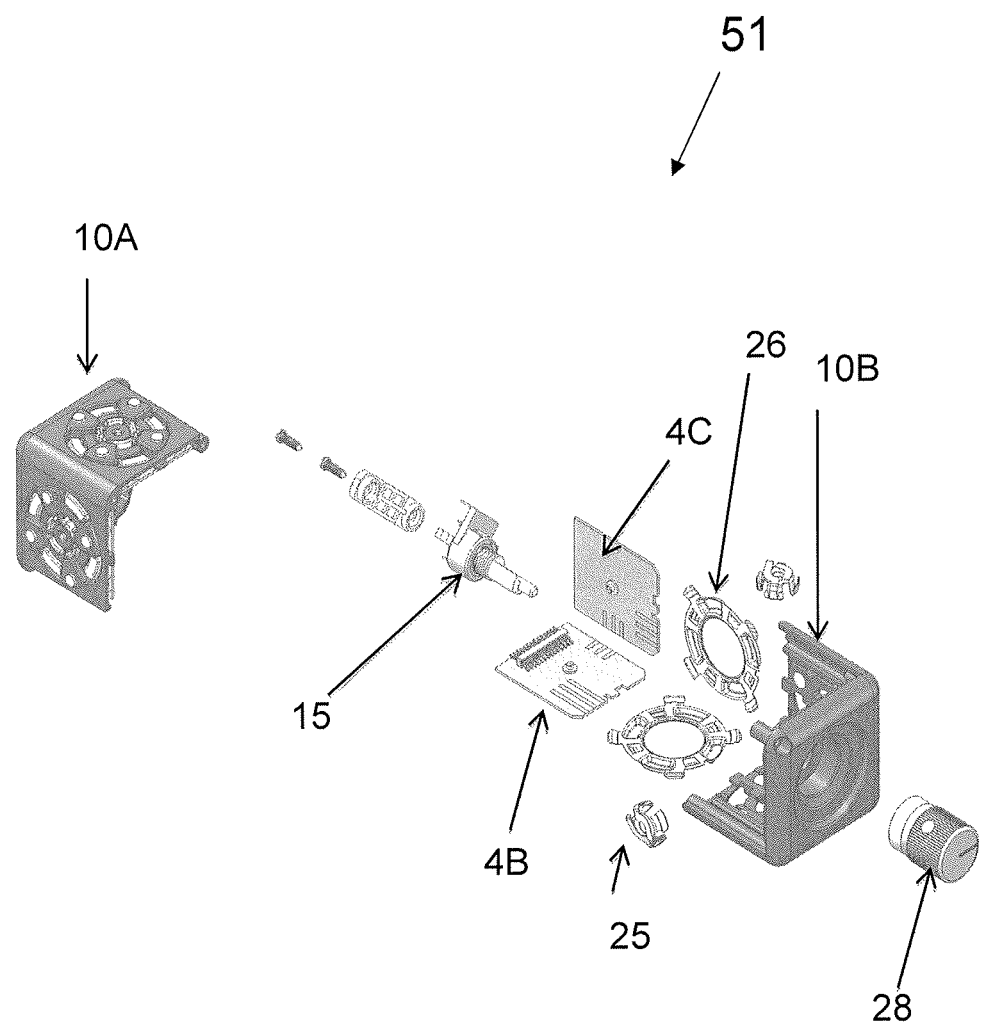
FIG. 12 is an exploded view of a knob block.

Now turning to FIG. 12, knob block 51 can contain a knob 28 mechanically mounted on a rotary linear potentiometer 15 mounted on one face that is wired to an analog input on the microcontroller.

Figure 4:
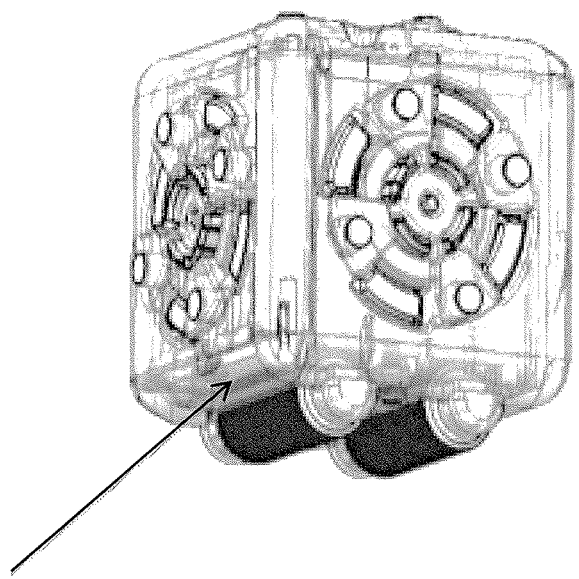
FIG. 4 is a pictorial representation of one embodiment of a modular unit with motorized rollers that are driven by a gear motor.
Figure 7:
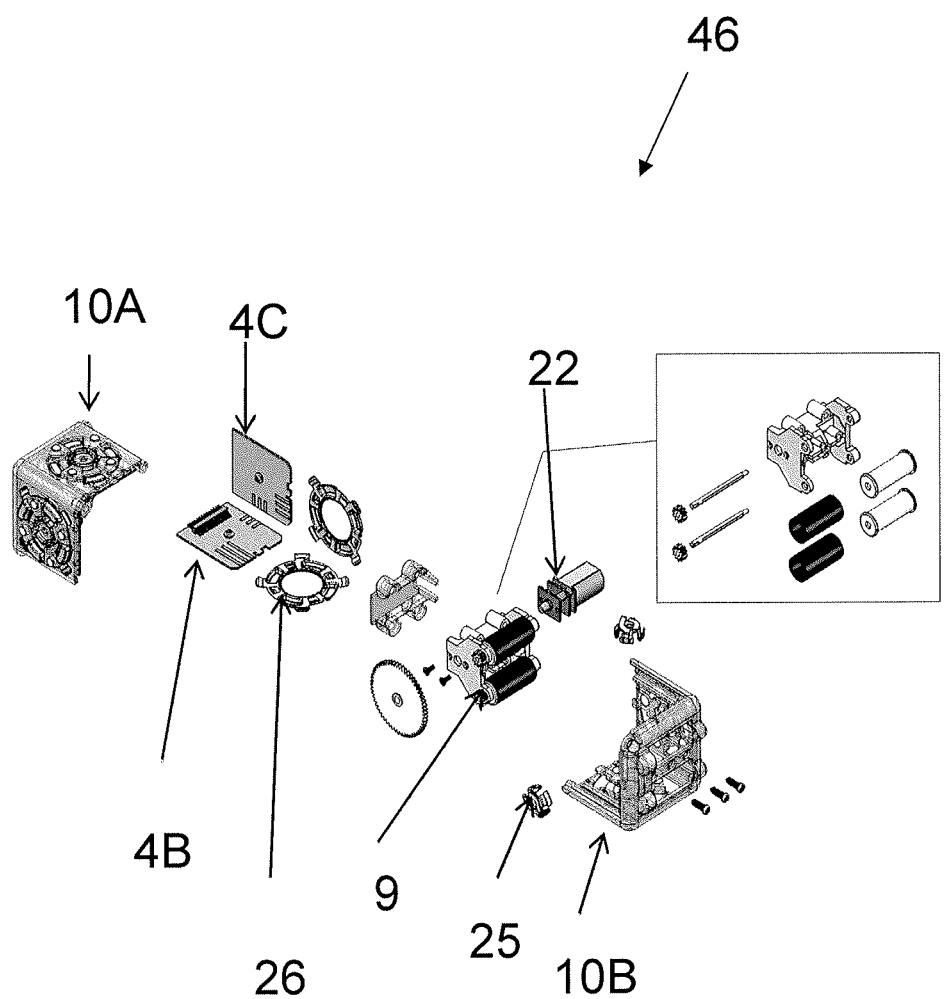
FIG. 7 is an exploded view of a motor drive or tread block.

Now turning to FIG. 7, tread block 46, for example, exposes two rubber-covered rollers 9 driven by a gear motor 22 inside the block (see FIG. 4). As mentioned above, the tread block 46 also contains a printed circuit daughterboard 4B containing an H-bridge integrated circuit that is wired to an analog output of the microcontroller and which is used to control the action of the motor 22.

Figure 13:
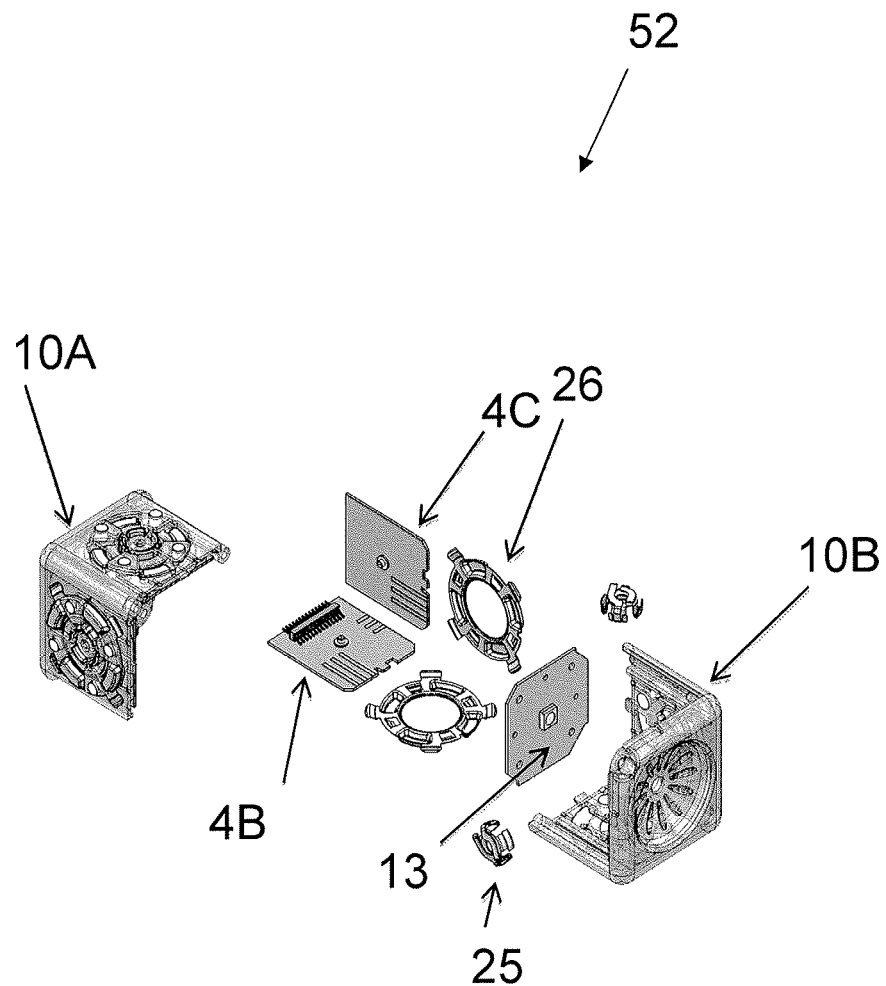
FIG. 13 is an exploded view of a flashlight block.

Now turning to FIG. 13, flashlight action block 52 can contain a bright LED 13 mounted on one face that is wired to an analog output on the microcontroller.

Figure 14:
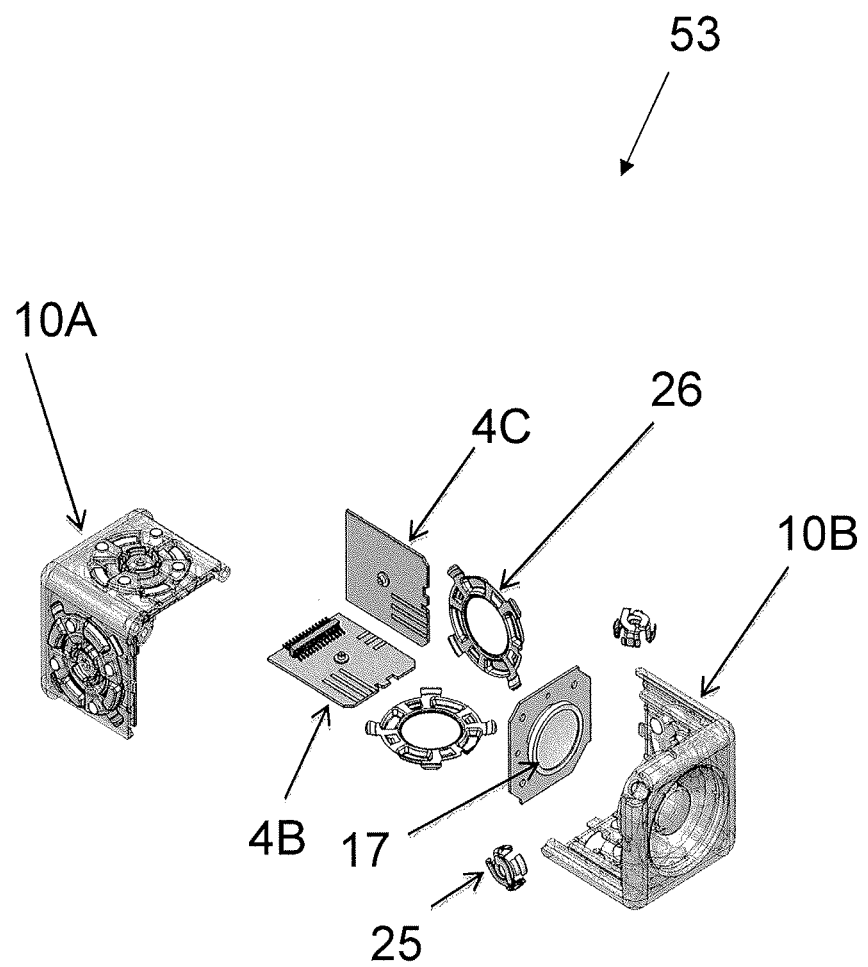
FIG. 14 is an exploded view of a speaker block.

Now turning to FIG. 14, speaker block 53 can contain a speaker 17 such as piezoelectric speaker mounted on one face that is wired to an analog output on the microcontroller.

Figure 8:
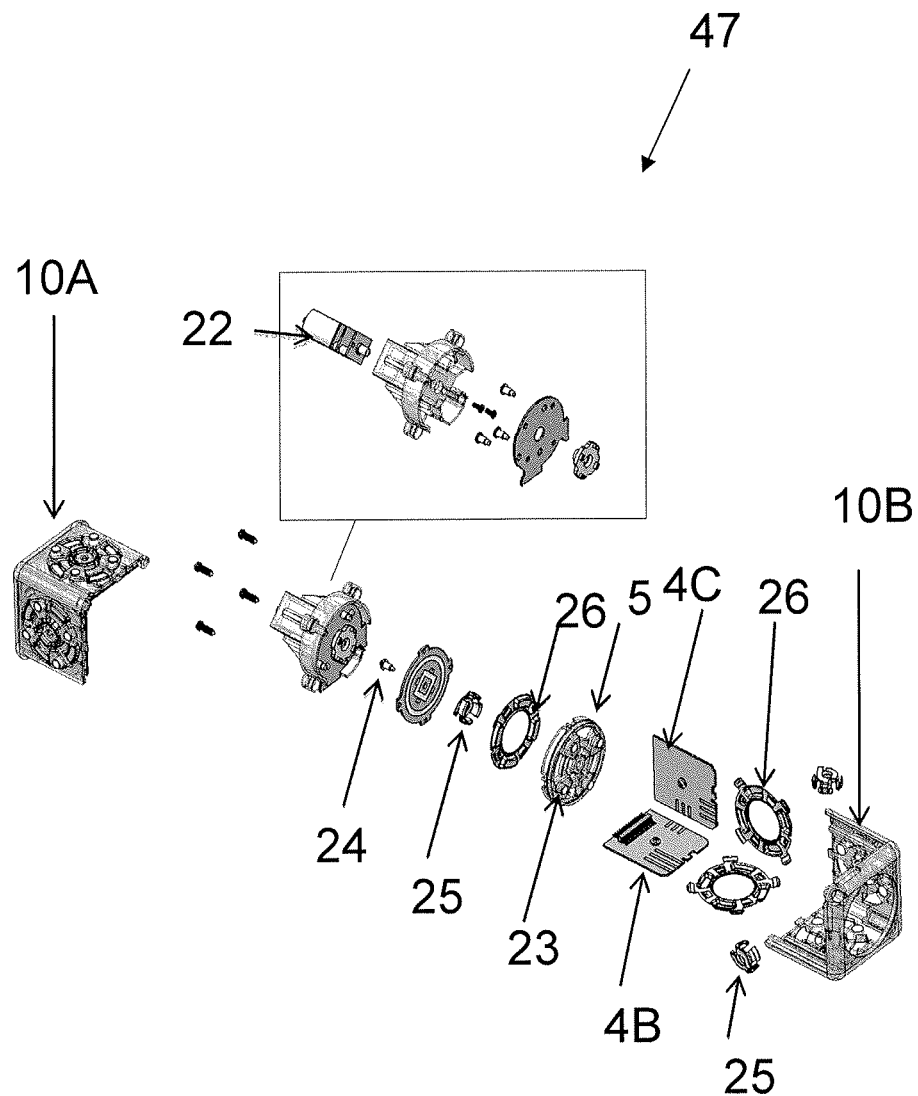
FIG. 8 is an exploded view of a rotating face block.

Now turning to FIG. 8, rotational actuator block 47 can contain a gear motor 22 and a printed circuit daughterboard 4B containing an H-bridge integrated circuit that is wired to control the action of the gear motor 22 that is wired to an analog output of the microcontroller and which is used to control the action of the motor 22. The gear motor 22 is connected to a disk 45, also called a rotating face 5, on one side 6 of the rotational actuator block 47, which contains a hermaphroditic connector 20. This enables the gear motor 22 to rotate the disk 45 on the face of the block 47 while it is connected mechanically and electrically to another block 2. The circuit board behind the rotating disk 45 has circular solder traces that enable the inner ring 25 and outer ring 26 of the hermaphroditic connector to maintain continuous electrical contact as the disk 45 rotates.

The embedded electronic device 4 inside each block 2 includes a printed circuit board 33 having a motherboard 4A, a daughterboard 4B, and wing boards 4C (see FIG. 6). Each circuit board 33 is mounted on the inner surface 12 of a side 6, and connects electrically to the hermaphroditic connector 20 having a portion extending beyond the outside surface 11 of side 6 (see FIG. 15). The circuit boards 33 inside each block 2 are electrically connected to one another and communicate power, ground and data signals.

An electrical connector 20 can also use magnetic force to from an integral electrical and structural connector to hold parts together physically as well as electrically to connect pairs of blocks 2. FIGS. 15-21 show photographs and drawings of connector 20. By "hermaphroditic," we mean that all connectors are identical: there are no "male" or "female" connectors. The connector is low cost and is used in applications where two components are required to connect both physically and electrically.

The connector 20 shown here is four-way rotationally symmetric. It could easily be modified to support a different number of rotations, such as two or six (or more). The connector 20 shown herein supports three electrical contacts, in this case for conducting a power signal, a ground signal, and a data signal, but it could be easily modified for more or fewer contacts.

The connector 20 has a front, or outer surface 11, which contacts another connector when it is connected, and a back, or interior side, which contacts a circuit board.

Embedded magnets 23 on each face or side 6 of block 2 and concentric rings 25, 26 and a center spring pin 24 connect the blocks 2 electrically. The magnets 23 on one block 2 and outer rings 26 on the other block 2 hold each pair of blocks 2 together physically by magnetic force.

When a pair of connectors 20 are held together physically by the magnets 23, and exerts an axial force that compresses the rings 25, 26, which holds the rings 25, 26 firmly against the circuit board 33 behind them. This force also holds the outer rings 26 and spring pins 24 in contact with one another on the outer surface 11 of side 6. The outer rings 26 can be made of any magnetic material, such as stamped steel.

Figure 15:
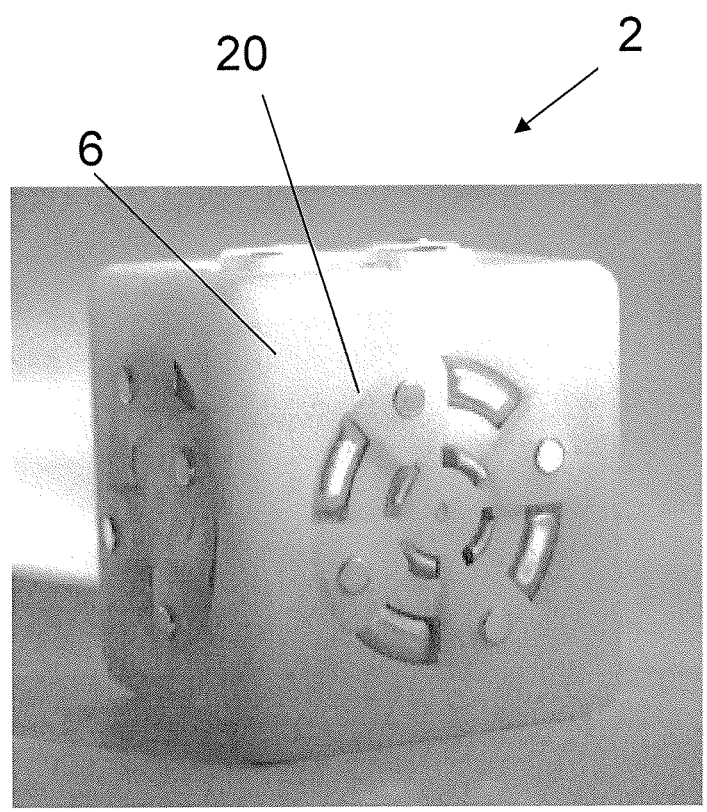
FIG. 15 is a pictorial representation of the present invention illustrating the hermaphroditic connector.
Figure 16:
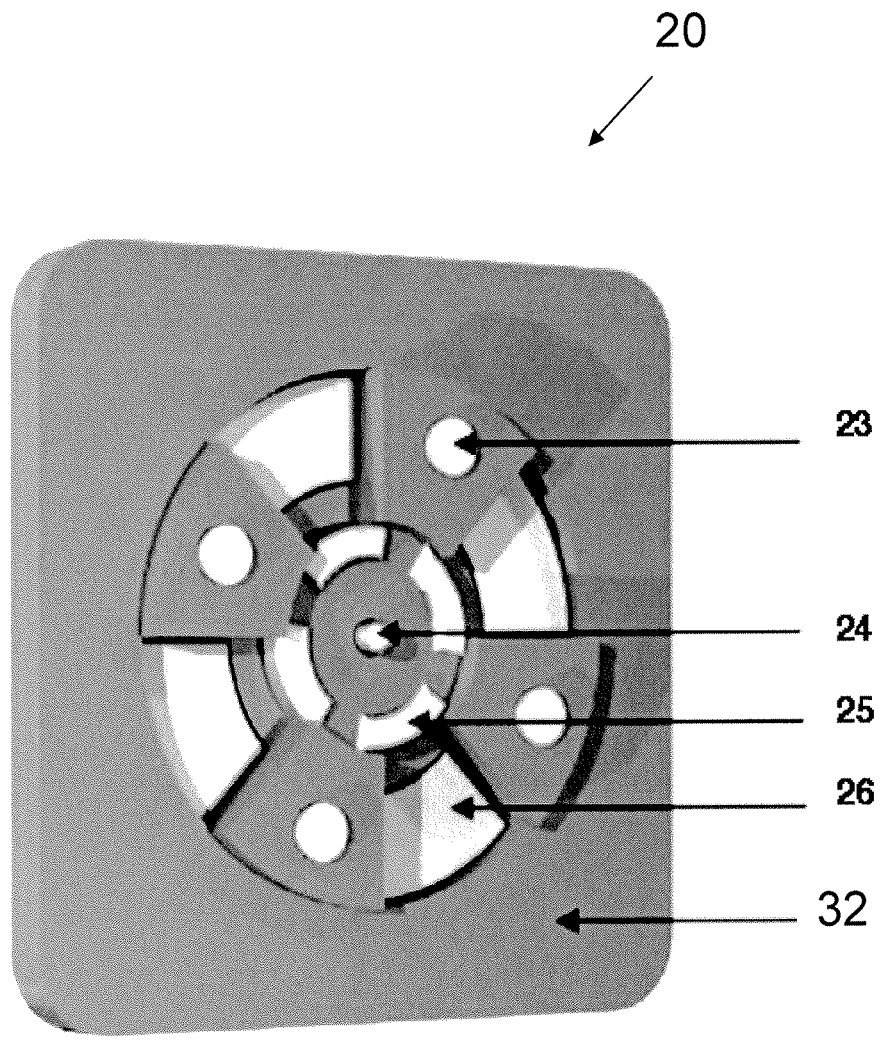
FIG. 16 is an exterior view of the hermaphroditic connector of one embodiment of the present invention.
Figure 17:
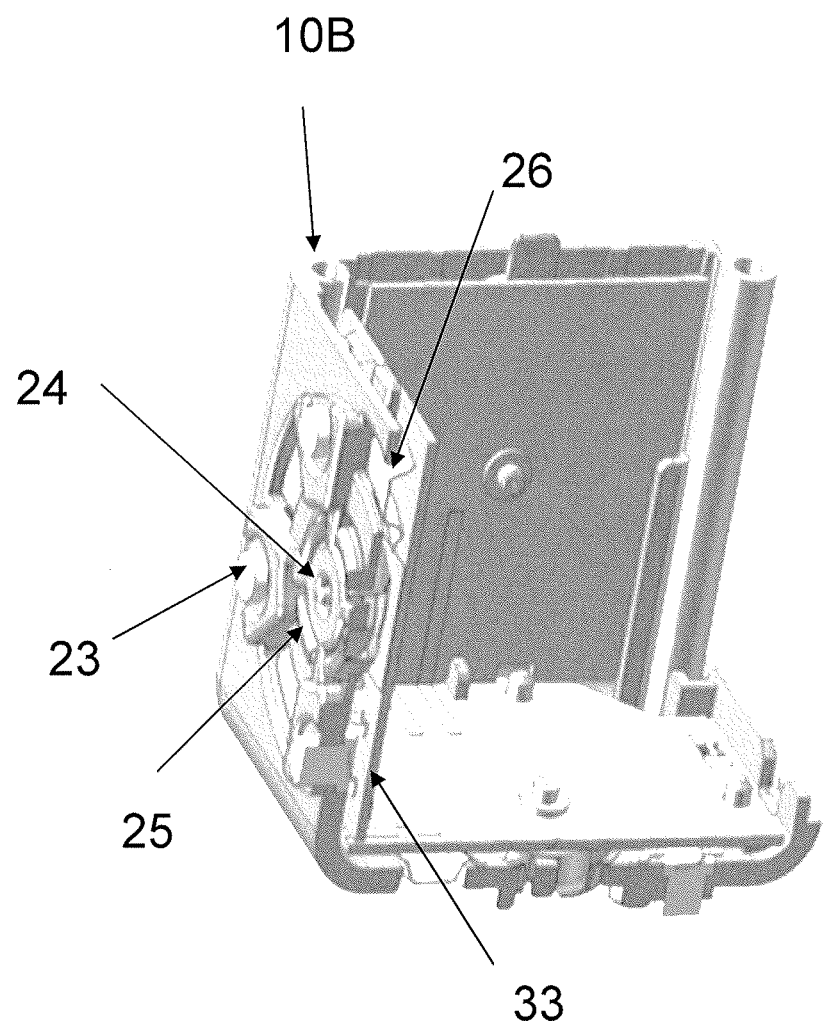
FIG. 17 is a perspective section view of one embodiment of the hermaphroditic connector on a halve section of the modular unit or block.

The rings 25, 26 connect electrically using metal spring clips to contact circuit boards 33 mounted on the inner surface 12 of each side 6. FIG. 15 shows a photograph of the connector 20 mounted in a face or side 6 of a block 2, exposing magnets 23, portions of the inner and outer rings 25, 26, and center spring pin 24. FIG. 16 shows a drawing of the connector 20 with these parts labeled, and FIG. 17 shows a cutaway view drawing of the connector 20 and circuit boards 33 mounted in a block half 10B.

Figure 18:
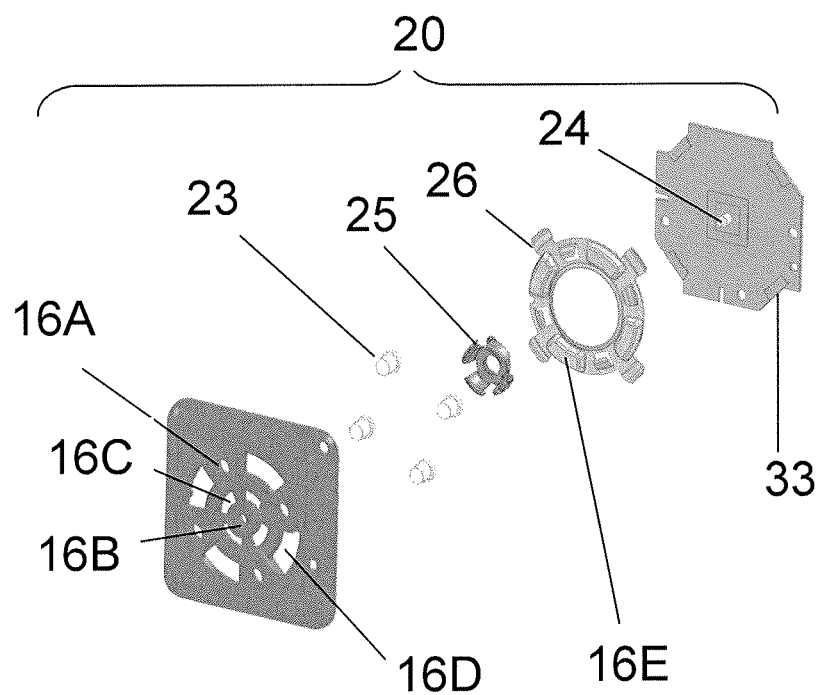
FIG. 18 is an exploded view of one embodiment of the hermaphroditic connector components disposed between a printed circuit board and a side of the modular unit or block.
Figure 19:
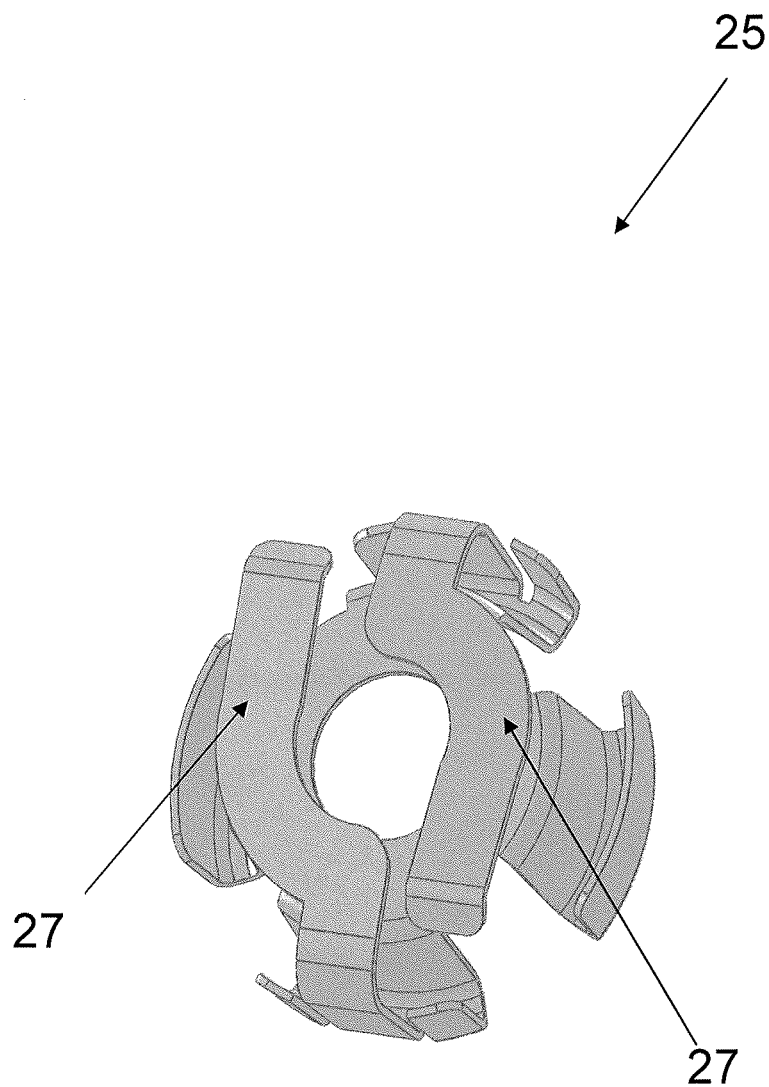
FIG. 19 is an interior perspective view of one embodiment of an inner ring showing sprung wings that contact a printed circuit board with opposing extensions that contact an adjacent modular unit or block.

FIG. 18 shows an exploded view of the parts of the connector 20 including magnets 23, spring pin 24, inner and outer rings 25, 26, and side 6. One embodiment of side 6 can be a plastic shell 32 (see FIG. 16). Four flanged magnets 23, shaped like top hats, can be inserted from the interior so that they cannot be pulled out of hole 16A of plastic shell 32 from the exterior. When two opposing connectors 20 are connected together, the magnets 23 of one connector 20 contact the outer ring 26 of the other connector (not shown). This union holds the two connectors together physically and creates one electrical contact. In the center of the connector 20, a spring pin 24 inserted through hole 16B of side 6 is used as the second electrical contact. When two connectors 20 are held together, their respective center spring pins 24 contact and their respective springs compress to adjust for axial variability. One embodiment of the inner and outer rings 25, 26, respectively, can be bent or stamped pieces of spring steel that extend into holes 16C, 16D, respectively, of side 6. Holes 16D are sized to receive extensions 16E of outer ring of block 2. Extensions 16E extend outward a predetermined distance from outer surface 11 of side 6 to sufficiently recess into holes 16D such that magnets 23 of opposing block 2 contact outer ring 26 of block 2 to electrically connect the respective printed circuit boards 33. When two opposing connectors 20 are connected, the inner ring 25 on one connector 20 contacts opposing inner ring 25 on the other connector to create the third electrical contact. FIG. 19 shows a drawing of the inner ring 25, with sprung wings 27 that contact the circuit board 33 at Point A (see FIG. 21).

Figure 20:
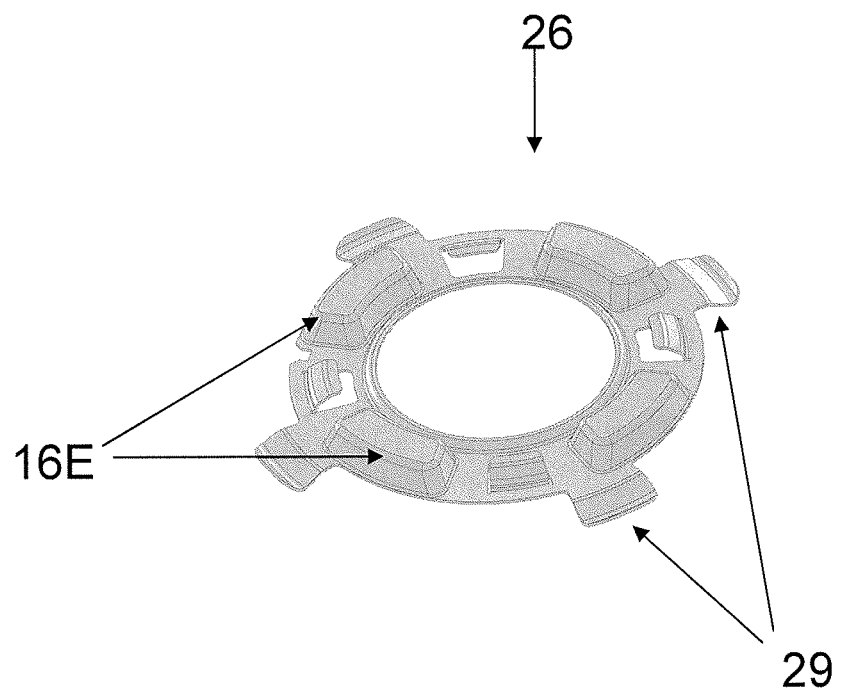
FIG. 20 is an outer perspective view of one embodiment of an outer metal ring with sprung wings that contact a printed circuit board with opposing extensions that contact an adjacent modular unit or block, and smaller wings that contact the magnets.
Figure 21:
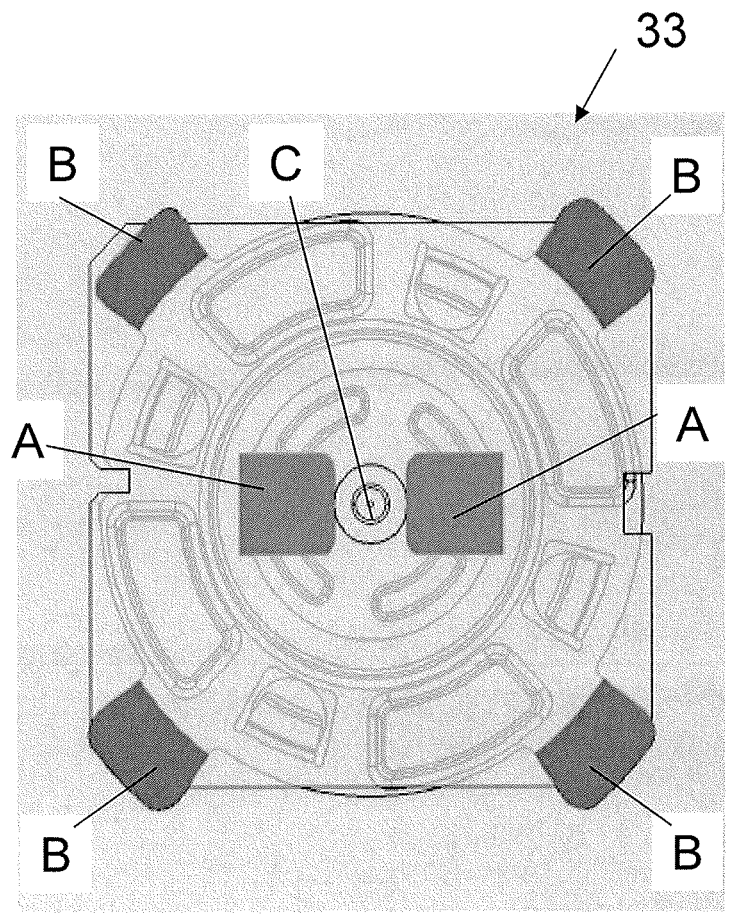
FIG. 21 is a pictorial representation of a printed circuit board of the present invention behind the hermaphroditic connector showing the locations where the outer metal ring (4 outer corner shaded areas), and inner ring (2 center shaded areas), and spring pin (center) of the connector contact the printed circuit board of the present invention.

FIG. 20 shows a drawing of the outer ring 26, with sprung wings 29 that contacts the circuit board 33 at Point B (see FIG. 21). Outer ring sprung wings 29 that contacts the magnets 23 on the connector 20 of the opposing block 2 and extensions 16E that contacts magnets 23 on its mating connector (not shown). Side 6, such as a plastic shell 32, including at least a number of apertures or holes equivalent to the number of extensions 16E of inner and outer rings 25, 26, and for magnets 23, and spring pin 24 to hold these components in place within connector 20.

On the back, or interior side, or inner surface 12 of the connector 20, a printed circuit board 33 makes electrical contact with the spring pin 24 and the sprung wings 27, 29 of inner and outer rings 25, 26, respectively. FIG. 21 shows a printed circuit board indicating the locations A, B, C where inner ring 25, outer ring 26, and spring pin 24 make electrical contact, respectively.

Each block in a construction possesses a dynamic one-byte value that determines how it operates with regards to software, block data values and behaviors. These values originate in sensor blocks, travel through the construction from block to neighboring block and are consumed by actuator blocks. Thus, sensors are data sources and actuators are data sinks. Operator blocks change data values that pass through them, according to their pre-programmed functions. Utility blocks (except for blocker blocks) simply pass data unchanged.

A Sensor block computes its value from environmental input. A light sensor block, for example, computes a value of 5 in a dark room and over 200 outside on a sunny day. For example, a touch sensor has a resting value of zero and 255 when it contacts another object.

Each Actuator block derives its value from data it receives from its neighbors. The Actuator block's action depends on this value. For example, a tread block drives along a surface with a speed proportional to its value. A Rotation block with a value of zero remains still, but with a value of 127 it rotates its active face at half speed.

The default firmware computes the Actuator block's value as the weighted average of the values it receives from all sources. Values originating closer to the block are weighted higher than values originating further away. The formula is as follows:

$$V = \text{Sum}\ (V1/D1 + V2/D2 + \ldots Vn/Dn)/n$$

where n is the total number of packets in the Action block's data store, $V1, \ldots n$ are the sensor values in arrived data packets, and $D1, \ldots n$ are the distances (hop-counts) for these data packets, respectively.

An Operator block computes its value as a function of the values it receives from its neighbors. The value of a Sum block, for example, is the arithmetic sum of its neighbors' values. The value of a Maximum block is the largest of its neighbors' values.

A simple example illustrates the flow of data values and resulting behaviors.

The robot (shown in FIG. 3) that steers away from light sources consists of two light sensor blocks, each atop a motorized tread action block, with a battery utility block joining them in the middle. Each tread block receives data packets from both light sensors. The hop count from the more distant Sensor block is higher, so each tread block's speed is more dependent on the Sensor nearest it. The side of the robot that is closer to the light will drive faster, causing the robot to steer away from the light.

Programs running in the blocks exchange data through the electrical connections on the block faces. They form a network that communicates data from sensor blocks to actuator blocks.

Blocks operate asynchronously, transferring data pairwise with no central clock. Each sensor block's value derives from its embedded sensor. Every other block's value is computed as a function of the number of steps from every sensor data source in the construction, with closer sensors having a greater influence than sensor that are farther away. Two sensor blocks at either end of a chain of blocks, for example, create a gradient of values along the blocks between them.

Each data transfer between a pair of blocks is done as a packet. Packets originate at sensor blocks, which produce the data values from their sensor readings. Packets are consumed by actuator blocks, which use the data values to determine the actuator's physical behavior.

Each packet contains the unique ID of the originating sensor block, a time stamp that indicates when the packet was created, a hop-count, and a data value. Each time a packet moves from one block to another, its hop-count is incremented by one. The hop-count therefore describes the distance the packet has traveled through the network from its sensor block source.

A propagation algorithm in the firmware program running in each block manages the flow of packets through the block. On arrival of an incoming packet from a neighboring block, the propagation algorithm compares the incoming packet's originating sensor block ID with other packets in its store. If any packets in its store have the same ID as the arriving packet, it compares the time stamps of the two packets. If the arriving packet is older than the packet in its store, it ignores the arriving packet. If the packet in its store is older, it deletes the packet in its store and adds the incoming packet to its store.

Each block constantly tries to establish a data connection with each of its neighbors, successively. Whenever a connection between two blocks is established, each connected block adds to its data store the contents of its neighbor's data store, eliminating the oldest packets originating from the same sensor, as described above.

The reprogramming system enables users to change a firmware program that runs in any unit of a distributed modular robot shown in FIG. 1.

A distributed modular robot is a collection, also called ensemble, of individual units also called modules, each comprising a microcontroller and additional electronics and mechanical components, and the having the ability to communicate with other units, some but not necessarily all of which include a sensor, such as a light, sound, or distance sensor, or an actuator such as a motor, speaker, or LED.

The overall behavior of a distributed modular robot is produced by local interactions among its units: A distributed modular robot has no single controlling unit. Therefore to program and reprogram the robot's behavior, a user must enter controlling code, called firmware, into individual units.

The reprogramming system described herein enables a user to compose and compile a program on a computer or mobile device, also called the programming platform, and load the resulting compiled firmware code into some or all of the robot's units. This enables a user to change the physical behavior of individual units and hence the behavior of the distributed modular robot.

Figure 22:
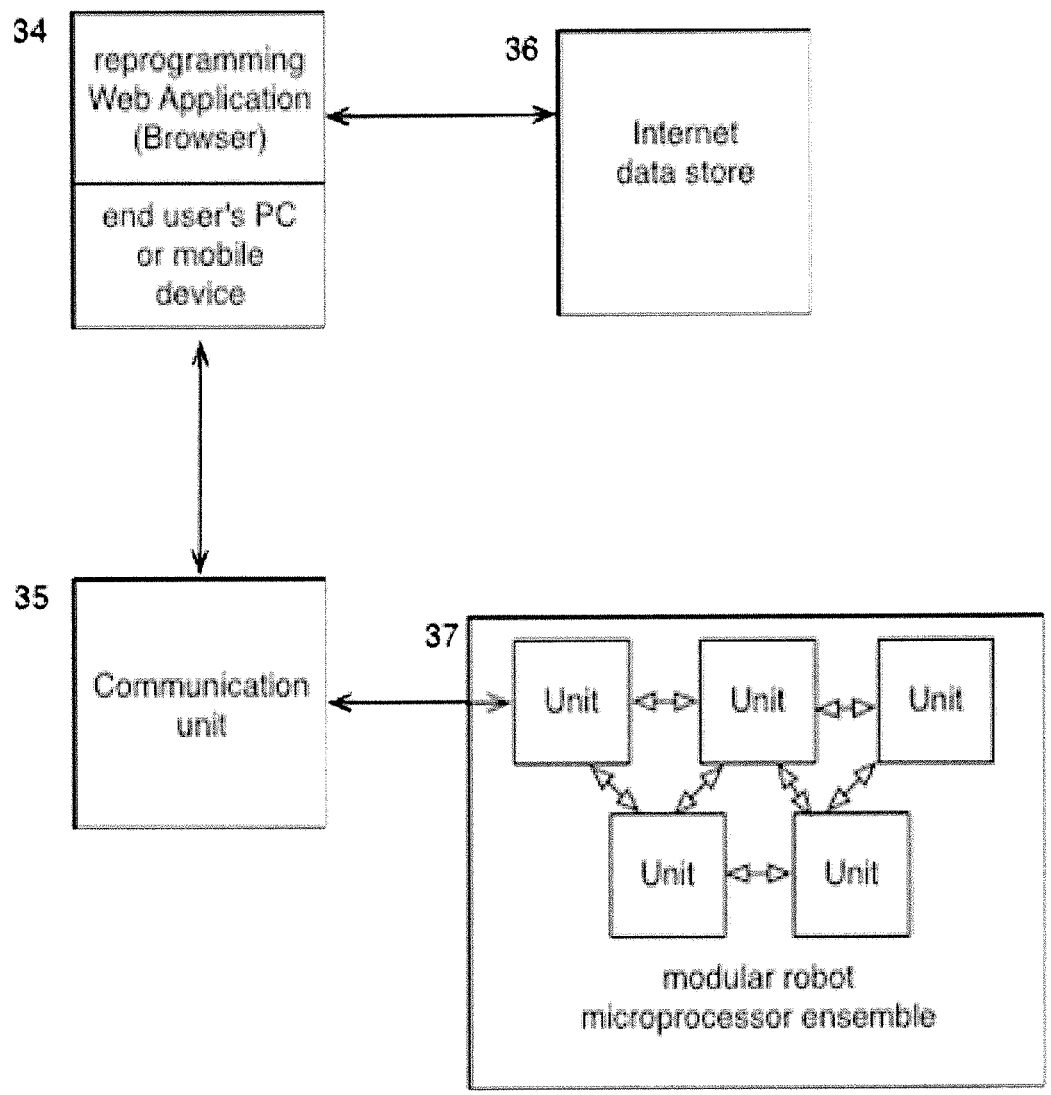
FIG. 22 is a diagram of parts and data exchange interactions of the reprogramming system of the present invention.

FIG. 22 shows a diagram of the parts (shown as rectangles) and data exchange interactions (shown as arrows) of the reprogramming system. The reprogramming system includes an editor and compiler running in a Web browser on a PC or mobile device 34, a wireless communication unit 35, the individual unit or units to be reprogrammed 36, and a database that stores source code programs associated with each unit 37.

Other embodiments of the present invention allowed the user to otherwise replace the unit's source code by (i) entering a new source code in an editor on the computer or mobile device, or (ii) editing previously entered source code selected from a database.

Figure 23:
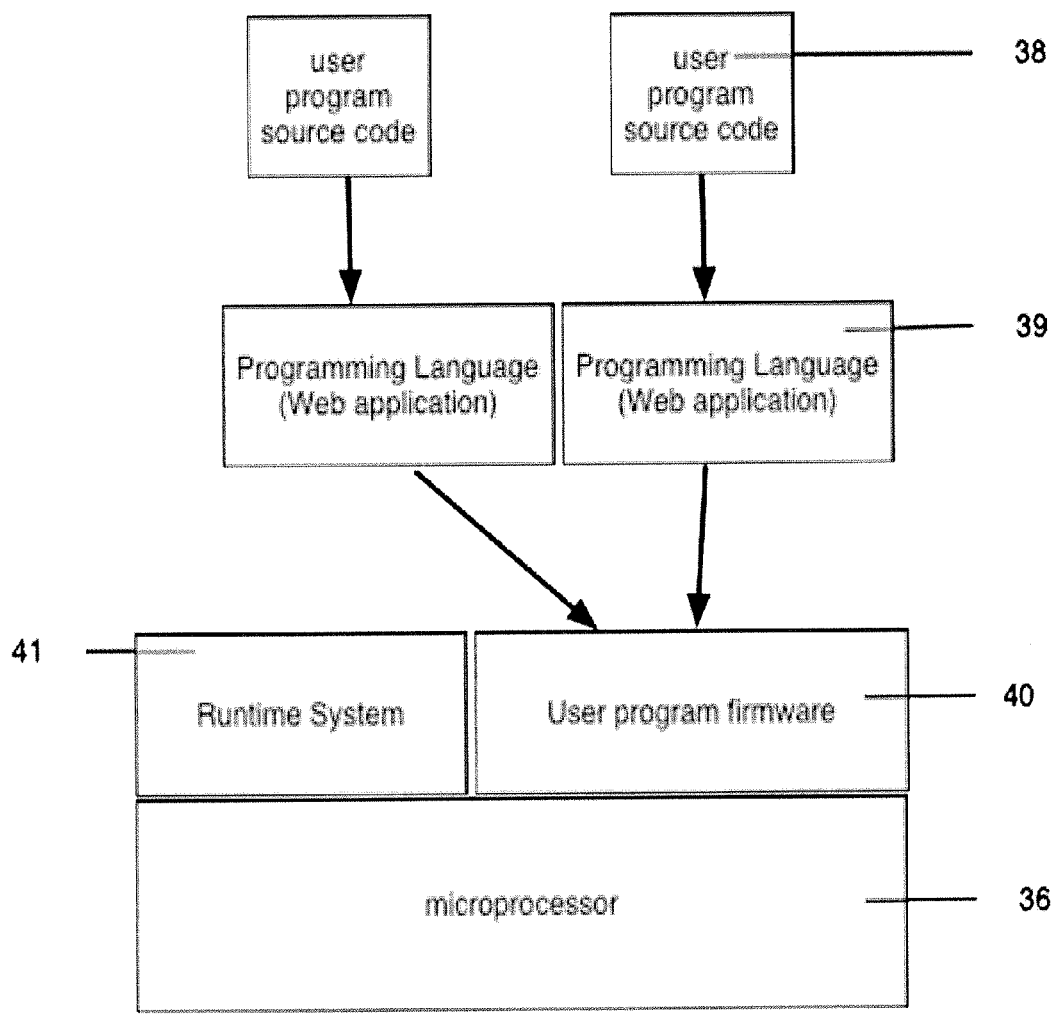
FIG. 23 is a diagram of the flow of information from user program source code to compiled code installed in microcontroller memory of the present invention.

FIG. 23 shows the flow of information from the user's source code program stored on the Internet data store 36 to the program installed in a target unit's microcontroller memory 37. Users compose programs 38 in a programming language using an editor and compiler 39, also called programming platform. The editor and compiler 39 operate in a Web browser running on a PC or mobile device. The programming language may be textual, such as the programming language C, or visual, such as the programming language Labview or Scratch. The compiler, such as the Gnu C Compiler (GCC), translates user's programs into firmware 40 for the target microcontroller 36. The resulting firmware 40 is then loaded into the microcontrollers 36 of specific target units of the modular robot, where it is executed. The user's compiled firmware program may use a runtime support system 41 that remains resident in the microcontroller's local memory.

Figure 24:
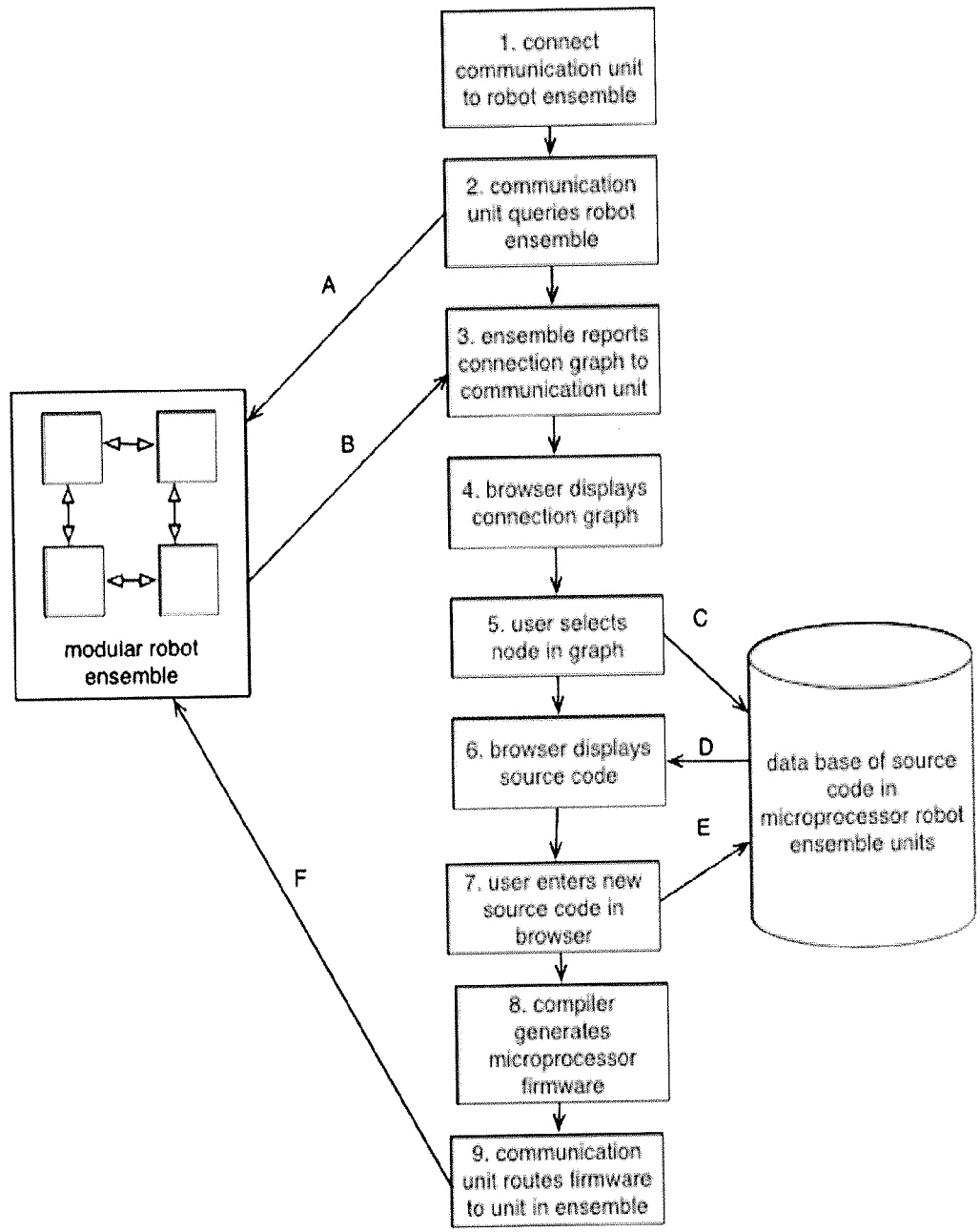
FIG. 24 is a process diagram of reprogramming system showing steps to reprogram a modular unit of the present invention.

FIG. 24 shows the sequence of operations entailed in reprogramming a modular unit. The sequence begins (step 1) when the user connects a computer or mobile device running a Web browser to the wireless communication unit via a wireless radio-frequency link using a protocol such as Bluetooth or Zigbee. The wireless communication unit, which is connected to the ensemble of microcontroller robot modules, then asks the ensemble to describe its units and their connections (step 2, arrow A). Each unit in the ensemble reports which other units it is connected to, and this information is passed to the wireless communication unit (step 3, Arrow B). The wireless communication unit assembles this list of individual pairwise connections. It reports this list to the PC or mobile device, which displays it in the Web browser (step 4), for example as a graph (see also FIG. 26). The user now selects a node in the graph (step 5) to indicate which unit in the ensemble is to be reprogrammed. The programming editor and compiler requests from the data store (arrow C) the source code for that unit. The data store provides the requested source code to the editor and compiler (arrow D), which displays it to the user (step 6). The user modifies or replaces the source code (step 7) and posts the new code back to the data store (arrow E). The programming editor and compiler compiles native code for the microcontroller (step 8) and sends this code to the wireless communication unit (arrow F). The wireless communication unit passes the code, as a reprogramming packet, on through the ensemble of robot modules to its intended target unit (step 9). When the target unit receives the reprogramming packet the target unit and one of its neighboring units collaborate to load the code into the target microcontroller.

Figure 25:
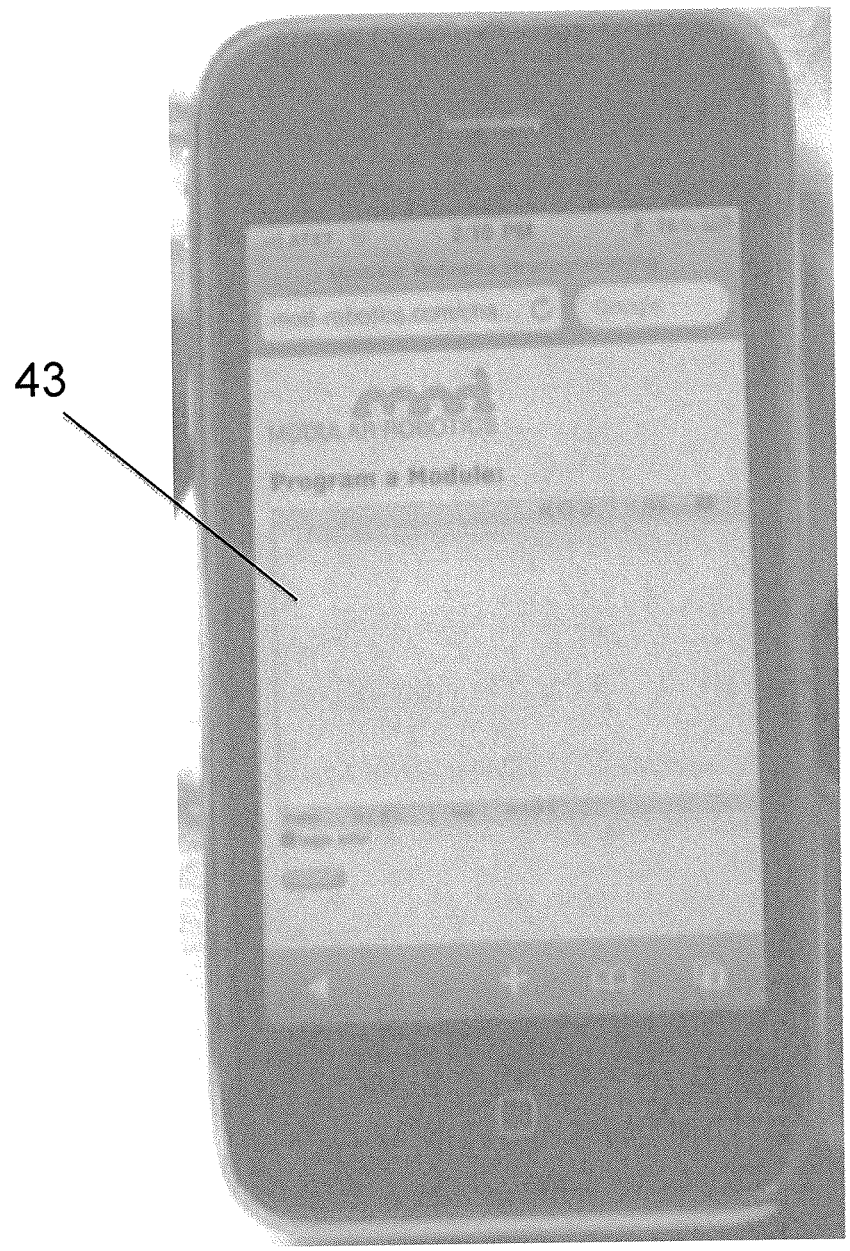
FIG. 25 is a representation of the text-based reprogramming web application of the present invention running on a mobile device.

FIG. 25 shows a representation of the text based programming editor and compiler running in a Web browser on a mobile device. The programming platform includes an editable text area 43 where a user can type in new code or view code retrieved from a database.

Figure 26:
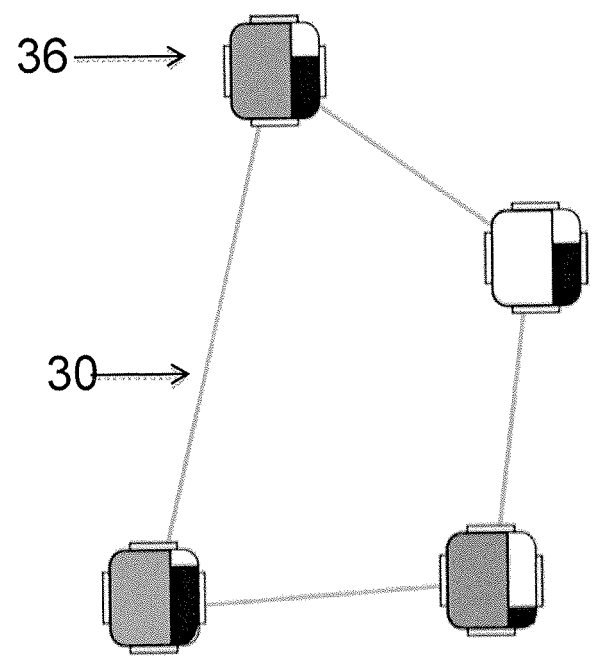
FIG. 26 is a construction view network graph of a four block construction.

The wireless communication unit reports, to the editor and compiler, the currently connected units' identities and connections of the modular robot to the reprogramming environment. The programming editor and compiler displays this to the user, for example as a graph in which nodes represent units 36 and edges represent connections 30 between units (FIG. 26). In the editor and compiler the user can then select a node from this graph, for example by clicking on it. The editor responds to this by retrieving, from the database, the source code for the firmware that is currently running in the corresponding modular robot unit, called the target unit.

Figure 27:
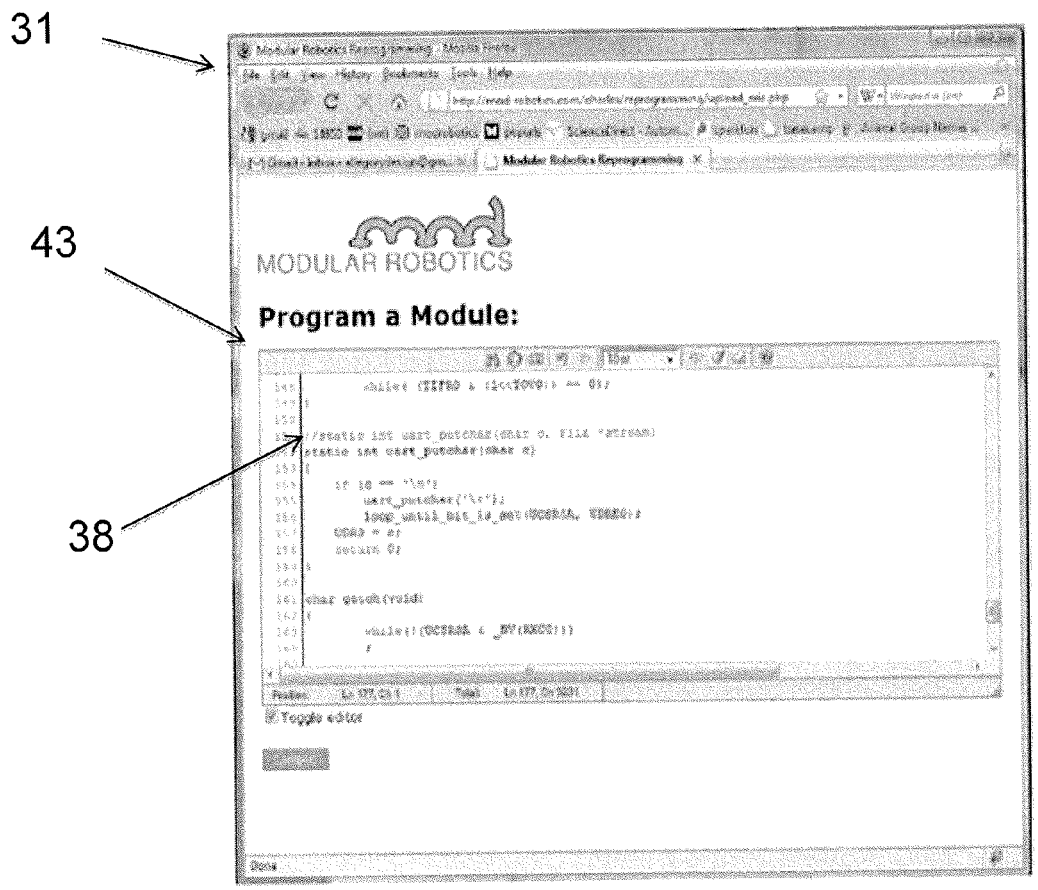
FIG. 27 is a screenshot of the text-based reprogramming web application of the present invention.

The programming platform, using the target unit's unique ID as an index, retrieves source code from a database stored on a server and displayed in a text-editing area 43 on the PC or mobile device screen 31. The user enters new source code in the text-editing area, compiles it, and downloads it into a unit. FIG. 27 shows a representation of the user's source code 38 for one unit displayed in a text editing area 43 for the user to modify.

Upon the user's request, which is indicated for example by the user pressing a button in the editor and compiler's screen interface, the editor and compiler posts the new source code to the database stored on the server, stamped with the current date and time. FIG. 28 shows a representation of this database.

The database contains source code for the firmware that is currently running on the unit, as well as previous versions of the firmware. The user can revert to a previous version of the firmware by selecting it in a menu; the editor and compiler displays the source code for this previous version in a text-editing area and the user can compile and download the program into the unit. Other embodiments of the present invention provide the capability of entering a new source code in an editor on the computer or mobile device or editing previously entered source code selected from a database.

In addition to posting the new source code to the database, when the user requests it, the editor and compiler compiles the user's program. If the code compiles without error, the editor and compiler sends the code to the wireless communication unit, which routes it to the designated target unit in the modular robot. The wireless communication unit waits for acknowledgement from the target unit that it has been successfully reprogrammed. When it receives this acknowledgement, the wireless communication unit conveys it to the programming editor and compiler, which in turn conveys it to the user. If the wireless communication unit receives no acknowledgement within a set time, the wireless communication unit conveys this information to the editor and compiler, which conveys to the user that reprogramming has failed.

Figure 29:
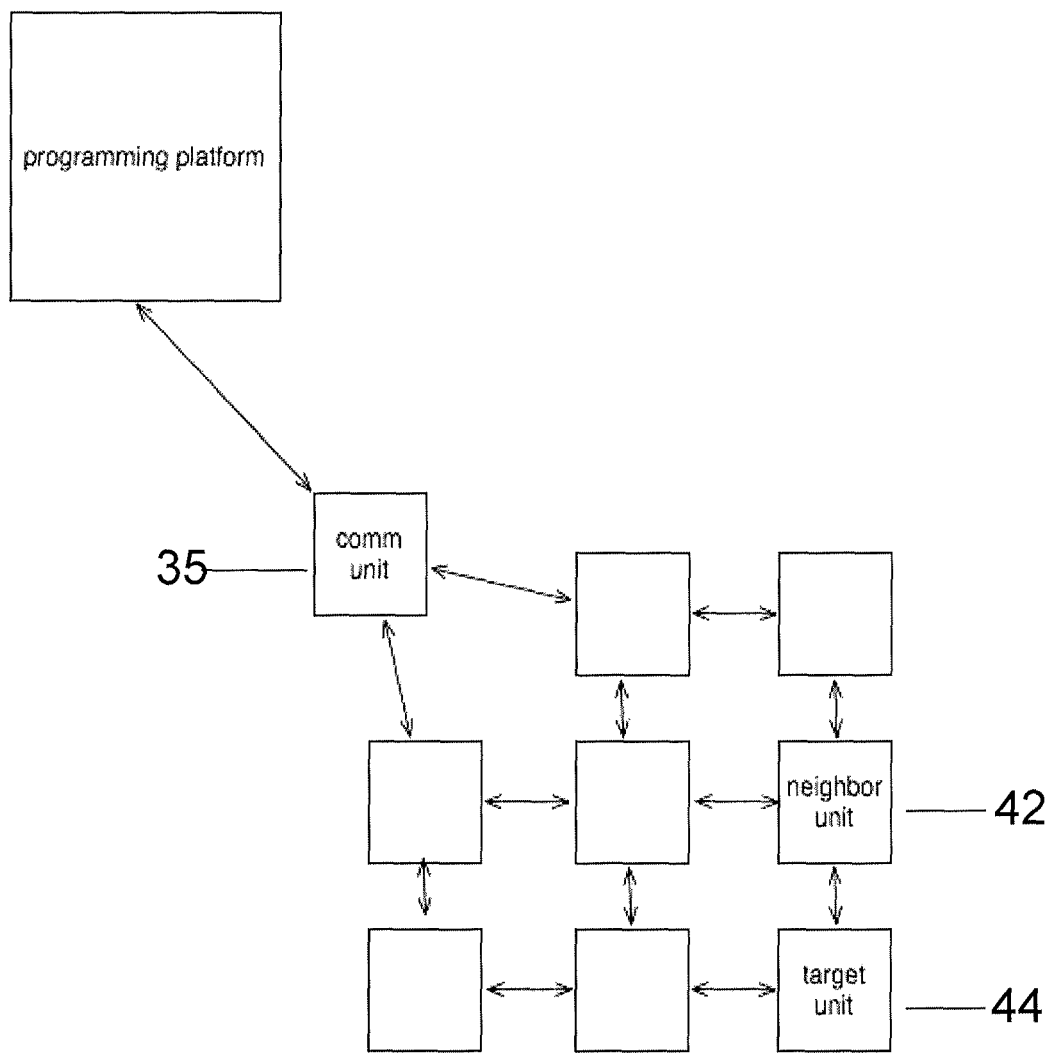
FIG. 29 is a representation of the communication network that connects the programming platform to the target unit.

The user's compiled program is copied from the wireless communication unit through the network of units in the modular robot to its designated target unit. FIG. 29 shows a representation of this network. This communication is labeled as a reprogramming packet.

When a unit in the modular robot receives a reprogramming packet that is targeted for another unit, it passes the packet to all the units it is connected to.

When a neighbor unit 42 in the modular robot receives a reprogramming packet that is targeted for another unit (target unit 40) that is directly connected to it, neighbor unit 42 passes the reprogramming packet to the target unit 40 and prepares to reprogram the target unit 40.

Figure 30:
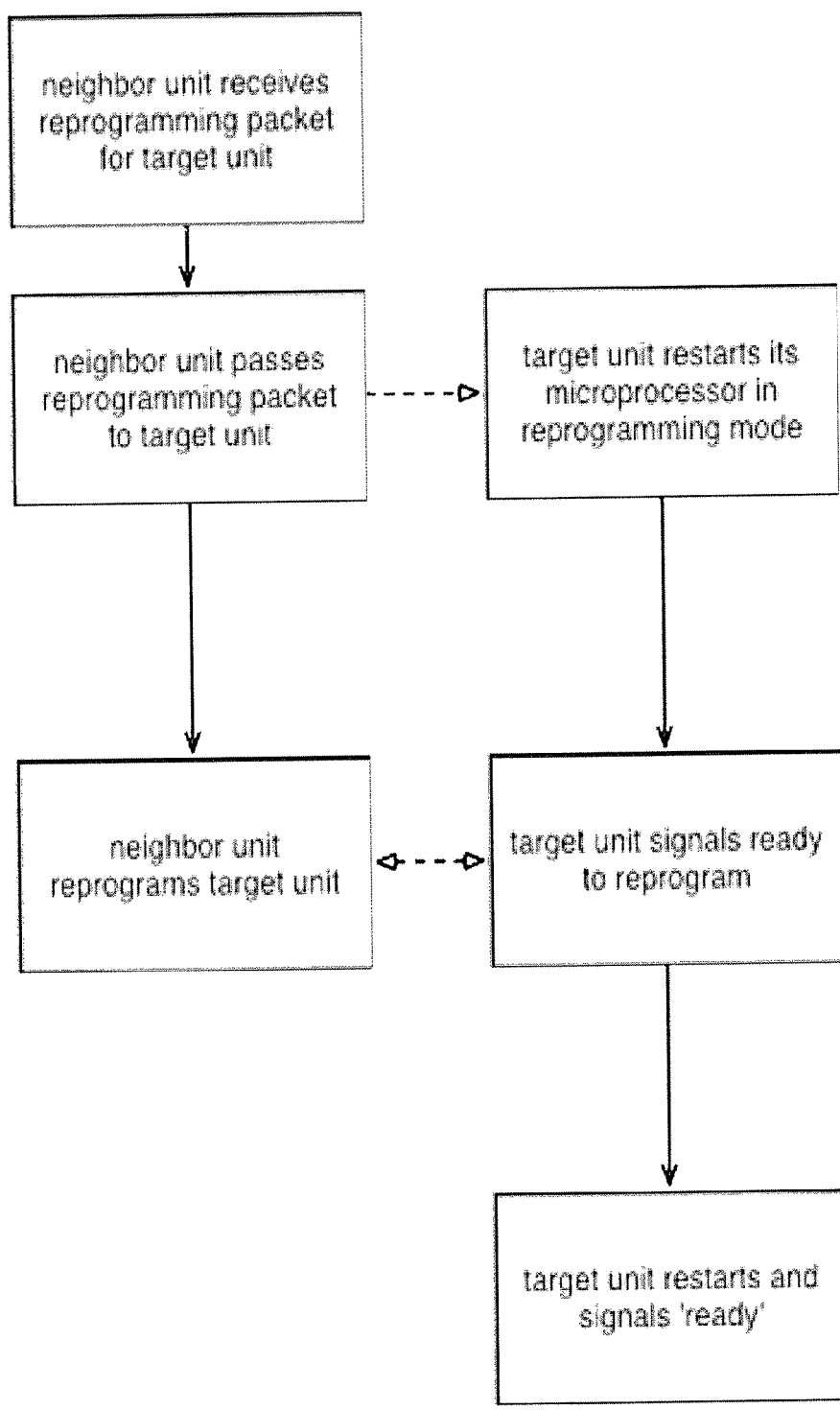
FIG. 30 is a flow diagram of the modular unit reprogramming software process of the present invention.

FIG. 30 shows the sequence of events that is initiated when a neighbor unit 42 (FIG. 29) receives a reprogramming packet that is designated for one of its neighbors, the target unit 40 (FIG. 21). If the target unit 40 has more than one neighbor unit 42, whichever neighbor unit 42 first connects with the target unit 40 initiates the reprogramming, and the target unit 40 ignores any other neighbor units 42 that try to connect to it. The reprogramming is accomplished using a bootloader program that is running in the target unit.

When the target unit 40 receives a reprogramming packet addressed to it, it restarts its microcontroller in reprogramming mode, also called bootloader mode, which begins to execute the bootloader program that is stored in its memory. When the target unit 40 restarts, it signals to its neighbor unit 42 that it is ready and waits for reprogramming by its neighbor unit 42.

The neighbor unit 42 waits until it receives a ready message from the target unit 40 and then reprograms the microcontroller of the target unit 40 using the bootloader program that resides on the microcontroller. The neighbor unit 42 sends the target unit 40 a reprogram message. The target unit 40 resets itself and starts its bootloader program when it receives the reprogram message. The bootloader program sets the target unit 40 to receive a new application program from the neighbor unit 42. The target unit 40 signals to the neighbor unit 42 when the reprogramming sequence is complete, and the target unit 40 passes an acknowledgement packet, also called ready packet, back to the wireless communication unit. Both target and neighbor units then return to their ordinary modes of operation.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

What is claimed is:

1. An educational construction modular unit comprising:
   a plurality of sides that form an interior volume, wherein each side of the plurality of sides includes an inner surface and an outer surface;
   a printed circuit board with a microcontroller that processes reprogrammable software, wherein the printed circuit board forms a gap between the inner surface of at least one side of the plurality of sides when assembled within the interior volume, wherein the printer circuit board is capable of exchanging power, ground, and data with an adjacent block;
   a hermaphroditic connector disposed on at least one of the plurality of sides, the hermaphroditic connector comprising an adjacent block connector and an electrical connector,
      wherein the hermaphroditic connector is symmetrical in at least two rotational orientations,
      wherein the adjacent block connector is disposed in the gap, wherein a portion of the block connector extends through the at least one side of the plurality of sides and beyond the outer surface thereof, and operably connects the modular unit with an adjacent modular unit when the adjacent block connector is operably connected to an adjacent block connector of the adjacent block; and
   an electrical connector mechanism disposed in the gap being in contact with the printed circuit board, wherein a protrusion of the electrical connector mechanism extends through the at least one side of the plurality of sides and beyond the outer surface thereof, and operably connects the printed circuit board with a printed circuit board of an adjacent block when the electrical connector mechanism is in contact with an electrical connector mechanism of the adjacent block.

2. The educational construction modular unit according to claim 1, wherein the block connector is a magnet.

3. The educational construction modular unit according to claim 1, wherein the electrical connector mechanism is a spring loaded pin.

4. The educational construction modular unit according to claim 1, wherein the electrical connector mechanism further comprises a biasing mechanism opposing the protrusion, wherein the biasing mechanism deflects in contact with the printed circuit board.

5. The educational construction modular unit according to claim 1, wherein the electrical connector mechanism comprises:
   a spring loaded pin;
   an inner ring with at least one protrusion, a biasing mechanism opposing the protrusion, and an outer perimeter; and
   an outer ring with at least one protrusion, a biasing mechanism opposing the protrusion, and a bore sized to receive therein the outer perimeter of the inner ring.

6. The educational construction modular unit according to claim 1, wherein the electrical connector mechanism is a hermaphroditic electrical connector.

7. The educational construction modular unit according to claim 1, wherein the plurality of sides are configured in two substantially identical interconnecting three-sided halves capable of interconnectivity.

8. The educational construction modular unit according to claim 1, further comprising a wireless communication device connected to the printed circuit board.

* * * * *